(12) United States Patent
Rishy-Maharaj et al.

(10) Patent No.: US 9,173,093 B2
(45) Date of Patent: Oct. 27, 2015

(54) SYSTEMS AND METHODS FOR REUSING A SUBSCRIBER IDENTITY MODULE FOR MULTIPLE NETWORKS

(75) Inventors: Ravi Rishy-Maharaj, Palo Alto, CA (US); Ira Anthony Wyant, Palo Alto, CA (US)

(73) Assignee: Gigsky, Inc., Palo Alto, CA (US)

( * ) Notice: Subject to any disclaimer, the term of this patent is extended or adjusted under 35 U.S.C. 154(b) by 271 days.

(21) Appl. No.: 13/480,343

(22) Filed: May 24, 2012

(65) Prior Publication Data

US 2012/0302284 A1 Nov. 29, 2012

Related U.S. Application Data

(63) Continuation-in-part of application No. 13/479,091, filed on May 23, 2012.

(60) Provisional application No. 61/489,636, filed on May 24, 2011, provisional application No. 61/489,228, filed on May 23, 2011.

(51) Int. Cl.
*H04W 12/06* (2009.01)
*H04W 12/04* (2009.01)
*H04M 15/00* (2006.01)
*H04M 17/02* (2006.01)
*H04W 4/24* (2009.01)
*H04W 8/18* (2009.01)
*H04W 76/02* (2009.01)

(52) U.S. Cl.
CPC ............ *H04W 12/06* (2013.01); *H04M 15/751* (2013.01); *H04M 15/7556* (2013.01); *H04M 15/7655* (2013.01); *H04M 15/773* (2013.01); *H04M 17/026* (2013.01); *H04W 4/24* (2013.01); *H04W 12/04* (2013.01); *H04W 8/183* (2013.01); *H04W 76/02* (2013.01)

(58) Field of Classification Search
CPC ........ H04W 12/00; H04W 12/06; H04W 8/04
See application file for complete search history.

(56) References Cited

U.S. PATENT DOCUMENTS 8,117,123 B1 * 2/2012 Gailloux et al. ................. 705/39
2003/0120920 A1 * 6/2003 Svensson ....................... 713/168
(Continued)

OTHER PUBLICATIONS (Not Yet Published) U.S. Appl. No. 14/171,720; Inventor: Rishy-Maharaj; Ravi Filing Date: Feb. 3, 2014 Title: Global e-Marketplace for Mobile Services.
(Continued)

*Primary Examiner* — Ajay Cattungal
(74) *Attorney, Agent, or Firm* — David Lewis; Jay White; Bowen Liu

(57) ABSTRACT

A system for utilizing a SIM device for connecting and subscribing to a local network of local mobile server systems on an ad hoc basis is provided. The system includes a SIM device that has computer readable medium storing instructions that cause the SIM device to store credential data including an authentication key from the local mobile server systems on an ad hoc basis after the SIM device has left the manufacturer. A local network of a local mobile server systems allows a SIM device to connect and subscribe to the local network of local mobile service systems on an ad hoc basis. At the local network of local mobile service systems a subscription request is received and credential data from the local network to the SIM device is transmitted on an ad hoc basis after the SIM device has left the manufacturer.

29 Claims, 16 Drawing Sheets

(56) References Cited

U.S. PATENT DOCUMENTS

| | | | |
|---|---|---|---|
| 2003/0235175 A1* | 12/2003 | Naghian et al. | 370/338 |
| 2004/0128509 A1 | 7/2004 | Gehrmann | |
| 2006/0246949 A1* | 11/2006 | Gupta et al. | 455/558 |
| 2008/0090568 A1* | 4/2008 | Venkateswarlu | 455/432.1 |
| 2009/0181662 A1* | 7/2009 | Fleischman et al. | 455/419 |
| 2009/0217058 A1* | 8/2009 | Obereiner et al. | 713/193 |
| 2011/0283001 A1* | 11/2011 | Jung et al. | 709/227 |
| 2012/0260095 A1* | 10/2012 | Von Hauck et al. | 713/176 |
| 2012/0275442 A1* | 11/2012 | Malets et al. | 370/338 |
| 2012/0282924 A1* | 11/2012 | Tagg et al. | 455/432.1 |
| 2013/0132854 A1* | 5/2013 | Raleigh et al. | 715/738 |
| 2013/0165075 A1 | 6/2013 | Rishy-Maharaj et al. | |
| 2013/0273911 A1* | 10/2013 | Mohammed et al. | 455/433 |

OTHER PUBLICATIONS (Not Yet Published) U.S. Appl. No. 14/171,751; Inventor: Rishy-Maharaj; Ravi Filing Date: Feb. 3, 2014 Title: Gifting Prepaid Data Plans.

* cited by examiner

SYSTEMS AND METHODS FOR REUSING A SUBSCRIBER IDENTITY MODULE FOR MULTIPLE NETWORKS

CROSS-REFERENCE TO RELATED APPLICATIONS

This application is a continuation-in-part of U.S. patent application Ser. No. 13/479091, entitled "DEVICES AND SYSTEMS THAT OBTAIN AND MANAGE SUBSCRIPTIONS FOR ACCESSING WIRELESS NETWORKS ON AN AD HOC BASIS AND METHODS OF USE" filed May 23, 2012, by Ravi Rishy-Maharaj et al., which is incorporated herein by reference, which claims priority benefit of U.S. Provisional Patent Application No. 61/489,636, entitled "SYSTEMS AND METHODS FOR REUSING A SUBSCRIBER IDENTITY MODULE FOR MULTIPLE NETWORKS," filed May 24, 2011, by Ravi Rishy-Maharaj et al., which is incorporated herein by reference; and which also claims priority benefit of U.S. Provisional Patent Application No. 61/489,228, entitled "DEVICES AND SYSTEMS THAT OBTAIN AND MANAGE SUBSCRIPTIONS FOR ACCESSING WIRELESS NETWORKS ON AN AD HOC BASIS AND METHODS OF USE," filed May 23, 2011, by Ravi Rishy-Maharaj et al., which is incorporated herein by reference; this application also claims priority benefit of U.S. Provisional Patent Application No. 61/489,636, entitled "SYSTEMS AND METHODS FOR REUSING A SUBSCRIBER IDENTITY MODULE FOR MULTIPLE NETWORKS," filed May 24, 2011, by Ravi Rishy-Maharaj et al., which is incorporated herein by reference; and this application claims priority benefit of U.S. Provisional Patent Application No. 61/489,228, entitled "DEVICES AND SYSTEMS THAT OBTAIN AND MANAGE SUBSCRIPTIONS FOR ACCESSING WIRELESS NETWORKS ON AN AD HOC BASIS AND METHODS OF USE," filed May 23, 2011, by Ravi Rishy-Maharaj et al., which is incorporated herein by reference.

FIELD

This specification generally relates to systems for establishing and maintaining subscriptions for networks.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be inventions.

Devices accessing cellular and data networks typically are limited to using the services of a primary network provider with limited coverage areas. When a user leaves the coverage areas, the user is often compelled to pay enhanced charges for roaming. The subscriber identity module ("SIM") typically limits a user from accessing networks with local coverage if the networks are not part of the core of the primary network provider. The primary network provider has specific access to the SIM, because the SIM has a secret authentication code, which may be any of $K_i$s, Ks, or any other code typically kept secret between the manufacturer of the SIM or the wireless device and the networks to which the SIM and/or wireless device connect. When referring to Ks in the specification, it is merely as an example of any secret authentication code. In this specification, $K_i$ and K may be substituted one for another to obtain different embodiments. $K_i$ is a 2G authentication key, and K is a 3G authentication key. The Ks are provided when the SIM device is manufactured and are protected by software such that the only entities with access to the Ks are the SIM manufacturer, the primary network provider and the internal software of the SIM. The limited access to the K is used to ensure that a wireless device using the SIM is limited to certain coverage areas to get local service and must pay roaming when the wireless device is outside the primary coverage area of a mobile network operator.

The limited coverage can make travelling very expensive, as a business traveler will often be outside of the traveler's primary network coverage area and will be forced to pay roaming charges. Roaming charges may be unnecessary if a local network is willing to provide coverage on an ad hoc basis.

Some have tried to expand the capacity of the SIM by allowing a second set of credentials to the SIM, hence allowing a device to access both the primary and secondary networks without paying roaming charges when in the primary or secondary coverage areas. Providing a second set of credentials is limiting in that the credentials are also installed before the SIM leaves the manufacturer, giving the user no choice as to the secondary network provider. Having only the primary and secondary set of credentials is also limiting in that the traveler may be in a place where neither the first nor the second networks have primary coverage. It also limits the number of subscription options a particular traveler may have in a location. For instance, the subscriber may want to have an unlimited data plan in a certain area, or will only require coverage in a particular area for a week. People have also attempted to use roaming hubs to establish connections with local services, but this does not provide a dynamic enough option to avoid roaming charges. Roaming hubs do not offer the user ad hoc connectivity based on any location and limits subscription options.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1A-7 is a brief description of each element, which may have no more than the name of each of the elements in the one of FIGS. 1A-7 that is being discussed. After the brief description of each element, each element is further discussed in numerical order. In general, each of FIGS. 1A-7 is discussed in numerical order and the elements within FIGS. 1A-7 are also usually discussed in numerical order to facilitate easily locating the discussion of a particular element. Nonetheless, there is no one location where all of the information of any element of FIGS. 1A-7 is necessarily located. Unique information about any particular element or any other aspect of any of FIGS. 1A-7 may be found in, or implied by, any part of the specification.

Figure 1A:
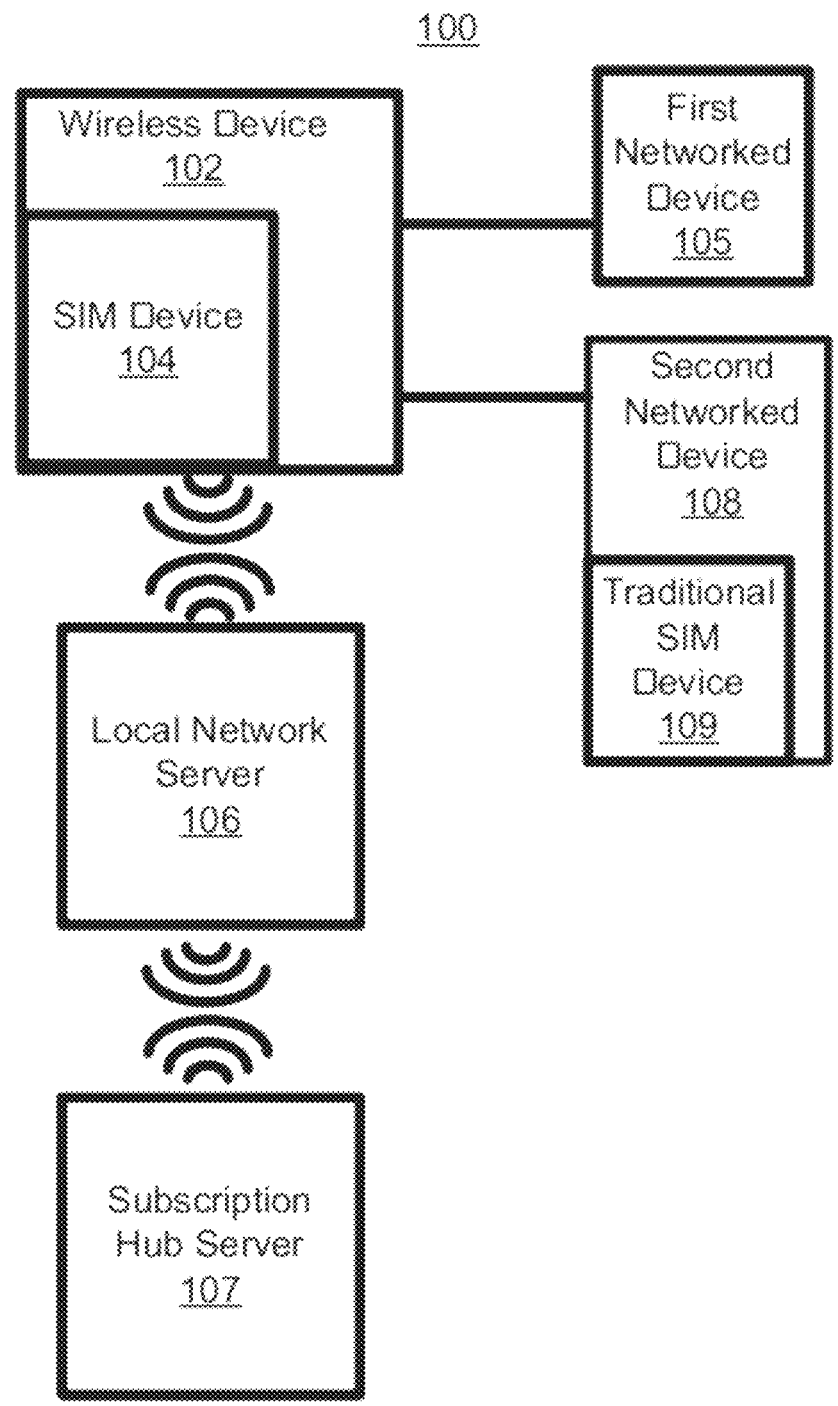
FIG. 1A shows an embodiment of a system for obtaining and managing subscriptions that is for accessing wireless networks on an ad hoc basis.

FIG. 1A shows an embodiment of a system for obtaining and managing subscriptions that is for accessing wireless networks on an ad hoc basis. The system 100 may include a wireless device 102, a SIM device 104, a first networked device 105, local mobile server systems 106, a service fulfillment server system 107, a second networked device 108, and a traditional SIM device 109, for example. In other embodiments, the system 100 may not have all of the elements listed and/or may have other elements in addition to or instead of those listed.

The wireless device 102 may be any wireless, electronic device capable of connecting to a network. Some examples of a wireless device 102 are a wireless router, phone, personal desktop assistant ("PDA"), laptop computer, tablet computer, or netbook computer, for example. The wireless device 102 may communicate with other networks and devices using any wireless protocol including, for example, Wi-Fi, WiMax, 2G, 3G, 4G, 4G LTE, UMTS, other satellite communication, or radio via a transceiver. The wireless device 102 may be configured to communicate wirelessly with the local hotspot network, the local network, the service fulfillment server system and the networked device.

The SIM device ("SIM") 104 is a device which holds subscription and credential information to be used by a device to connect to a local network on an ad hoc basis. Connecting on an ad hoc basis implies that one is connecting to a network with new credentials even after a SIM 104 has left the manufacturer. Connecting on an ad hoc basis means that the wireless device 102 can accept new credentials from a local network in order to avoid paying roaming charges for data usage and can do so after the SIM 104 leaves the manufacturer. The credentials stored on the SIM may include a new authentication key (such as a "$K_i$" or "K"), International Mobile Subscription Identity ("IMSI"), and location area identity, for example.

The SIM device ("SIM") 104 is used to store and transmit network credentials as well as other elements of a subscription profile. In one embodiment, the SIM 104 may receive and store new credentials to the SIM memory system on an ad hoc basis (the components of SIM 104 are discussed below in FIG. 1B).

Connecting on an ad hoc basis implies that one is connecting to a network with new credentials even after a SIM 104 has left the manufacturer. Typically the SIM would be restricted to receiving local service to a primary and potentially secondary provider after the SIM 104 has been embedded with a primary and potentially secondary K at the time of manufacturing or personalization. Connecting on an ad hoc basis means that the wireless device 102 can accept new credentials from a local network in order to avoid paying roaming charges for data usage and that wireless device 102 can accept new credentials after the SIM 104 leaves the manufacturer. The credentials stored on the SIM may include a new K, International Mobile Subscription Identity ("IMSI"), and location area identity, for example.

The authentication code is a code used to access mobile network operators. The authentication code may be for example, a $K_i$ for a SIM or a K for a USIM, depending on the type of network the credential are used to access. A K may be a 128 bit code that is typically present on SIM 104 and is, to date, not changed after the manufacturing or personalization process. The IMSI may be a number used to identify an individual or device on a mobile network. The IMSI may include a mobile country code, a mobile network code and the mobile subscriber identity number, for example. The location area number may describe the location of the wireless device 102.

The SIM 104 may be a separate, independent unit or SIM 104 may be an integrated element of a wireless device 102. For instance, in one embodiment, the wireless device 102 may have a simulated universal subscriber identity module ("USIM") stored in the wireless device memory system. Credentials may be electronically transmitted to a USIM. In one embodiment, the wireless device 102 may connect to code division multiple access networks ("CDMA") and do so using a removable user identity module ("R-IUM") in substantially the same way as a SIM. In another embodiment, the SIM 104 may be a standalone piece of hardware that can interact with other devices. The wireless device 102 is used to connect to secure networks requiring subscriptions on an ad hoc basis by writing and transmitting credentials on the SIM 104. The SIM 104 may be communicatively coupled to the wireless device 102 physically or wirelessly.

The SIM 104 may include a SIM input/output system, SIM processor system, SIM memory system and subscription and credentialing routines. In one embodiment, the SIM 104 may in fact merely be an application stored on the device memory system. The functionality of the SIM input/output system, SIM processor system, and SIM memory system could all be accomplished by the device output system, device input system, device processor system and the device memory system.

In this specification, the term user and the user's machine may be substituted one for another to obtain different embodiments. The user may choose to use a wireless device 102 to connect to a local network in order to avoid roaming charges. The wireless device 102 may be configured to transmit requests for subscriptions from a user of the wireless device to a service fulfillment server system. Transmitting the request for subscriptions may be accomplished via any routing network including the local mobile server systems, a Wi-Fi network locally, or a WiMax network locally, for example. In embodiments in which an unsubscribed-to network is used to initially gain a new subscription, the user may have to pay roaming charges to connect to the Service fulfillment server system. Alternatively, the wireless device may use other channels to establish a subscription including, unstructured supplementary data ("USSD") protocols, short message service ("SMS") protocols with a roaming profile, or other Internet protocol ("IP") Internet protocol communication channels, for example.

The first networked device 105 is a device that can connect to the wireless device 102 via the local hotspot network (potentially gaining access to the local network as a result of a subscription to the local network) to provide data from the local network without accruing roaming charges. The networked device 105 may be any electronic device capable of networking with other devices including, for example, a computer, a server, a cellular phone, a router, or personal desktop assistant.

The local mobile server systems 106 provides local subscriptions that may be less expensive than the roaming charges of a user's subscribed-to data network when a user is outside of the primary coverage area of the user's primary data network. The local mobile server systems 106 may be any network, mobile network operator, server, computer, or other data management system, for example, which is capable of managing data. The term server systems can imply the inclusion of one or more servers running on one or more machines. The server systems may provide a network of services. The local mobile server systems 106 may comprise any number of computing devices.

In one embodiment, the local mobile server systems 106 may be a mobile network operator. A mobile network operator is a provider of wireless communications services that owns or controls all the elements necessary to sell and deliver services to an end user including radio spectrum allocation. What distinguishes mobile network operators from other networks is that the mobile network owns or controls access to a radio spectrum license from a regulatory or government entity. Mobile network operators are loathe to allow people to access their networks directly on an ad hoc basis. Mobile network operators may require that a wireless device 102 have a SIM 104 with a manufacturer installed K code that is known only to the mobile network operator, the original manufacturer, and the device memory system to allow the wireless device 102 access. In one embodiment, the local mobile server systems 106, as a mobile network operator, may allow the wireless device to connect on an ad hoc basis and transmit Ks and IMSIs to the SIM 104 via the wireless device 102.

The service fulfillment server system ("SFSS") 107 is a network which coordinates data subscriptions and allows the user located outside of the coverage area of the user's current subscriptions to subscribe to local mobile server systems 106 with local network coverage. In providing the subscription, the SFSS 107 may provide the wireless device 102 with local service at a rate less than the roaming rates the user's subscribed-to plan may charge in a particular location by giving the SIM 104 credentials to allow the wireless device to connect to a local mobile server systems 106.

The SFSS 107 may be any network, server, computer, or other data management system, for example, which is capable of managing data. The SFSS 107 may comprise any number of computing devices. The SFSS 107 may receive a request to subscribe to a local network from the wireless device 102. The SFSS 107 may determine the location of the user, for example, by GPS, and determine, based on the location, the available local networks. One of these local networks may be the routing network used to subscribe to the local mobile server systems 106 or may be the local mobile server systems 106 itself, for example.

Upon determining the available local networks, the SFSS 107 may also accumulate data regarding the subscription terms of the local networks. The SFSS 107 may then transmit the data regarding the available local networks and the networks' respective subscription terms to the wireless device 102.

In one embodiment, the SFSS 107 may transmit data representing mobile network operators that do not rely on other networks. The larger network providers generally require that a mobile device 102 have proper credentials including a K and an IMSI in order to gain access to the mobile network operators. Unlike some of the pay-as-you-go hotspots, the mobile network operators do not allow users to add new credentials for accessing the networks of the larger network providers. The SFSS 107 may be configured to transmit Ks and IMSIs to the SIM 104 via the wireless device 102, such that the local mobile network operators consider the wireless device 102 to be subscribed to the local mobile server systems 106.

In one embodiment, the wireless device 102 may itself select the best value for a local network based on preferences created by the user or based on preprogrammed defaults. In an alternative embodiment, the user may select the plan that best suits the user's needs. For instance, there may be a plan that lasts for a month and costs $300 and allows for the use of 100 minutes of cell phone time and 3 gigabytes of data. Another plan may offer only a week of coverage with 25 gigabytes of data and 200 minutes of talk time and only cost $75. If the person will only be in the location for a week or if the person requires more talk time or data transfer services, the latter plan may be better. In the embodiment in which the user selects the plan to be used, the wireless device 102 may have a display to display the terms of service and have a user input device to allow the user to select the preferred plan. Alternatively, the wireless device may transmit the subscription list with terms of service to be displayed on another device.

When a subscription selection has been made, the wireless device 102 may transfer data representing the network and plan selected as well as an agreement to accept terms of service to the SFSS 107. The SFSS 107 may account for the change in its subscription register. The SFSS 107 may then transmit the request to the selected local mobile server systems 106.

The local mobile server systems 106 may be configured to periodically transmit new terms of service, areas of service, or services offered, for example, to update the SFSS Location Register on the SFSS 107. In doing so, the local mobile server systems 106 provides up-to-date information regarding the services the local mobile server systems 106 offers to those who choose to use the SFSS 107 to subscribe.

The local mobile server systems 106 may receive a subscription request from the wireless device 102, via the SFSS 107. Upon receiving the initial request to subscribe to the local mobile server systems 106, the local mobile server systems 106 may determine that the wireless device 102 is not subscribed to the local mobile server systems 106 by searching the subscription profile which may be stored in the SIM memory system. Upon determining that the wireless device 102 is not subscribed, the local mobile server systems 106 may add information identifying the wireless device 102 to local mobile server systems 106's visitor location register in order to record that a person who is not subscribed attempted to connect.

Upon accepting the subscription request, the local mobile server systems 106 may transfer the identification information associated with the wireless device 102 to the home location register, representing that the wireless device is now subscribed to and can access the local mobile server systems 106.

The entity controlling the SFSS 107 may have contracts with the entity controlling the local mobile server systems 106 such that the local mobile server systems 106 may transmit a confirmation of the subscription as well as confidential credentials that the wireless device 102 can use to access the local mobile server systems 106. These credentials may include, for instance, an international subscription identity ("IMSI"), encryption keys ("$K_c$"), on or more Ks (e.g., the K stored in SIM memory system 114), and/or location information, for example. Confidential transfer of credentials may be accomplished by encrypting K and/or other data with encryption keys $K_c$, for example. The encrypted data may be transferred from local mobile server systems 106 to wireless device 102 and by the SFSS 107 and decrypted by the wireless device 102 and by the SFSS 107. When the credentials are transferred to the wireless device 102, the data may be stored in the memory of wireless device 102 or on a separate or integrated SIM device for example.

In another embodiment, the SFSS 107 may be consulted for the local networks 106, and all other operations may be carried out between the wireless device 102 and the local mobile server systems 106. In this embodiment, the SFSS 107 may not necessarily communicate with the local mobile server systems 106 except to receive data representing updated services and terms of service. The wireless device 102 may communicate with the SFSS 107 only in order to find the local subscriptions.

When the confirmation of subscription is transferred to the SFSS 107 and the wireless device 102, the SFSS 107 and the wireless device 102 may update the subscription profiles stored in the Subscription Register and the SIM memory system to account for a change in a particular wireless device's 102 subscription profile. A subscription profile may be data describing the different subscriptions. The subscription profile may have data including the device's location, information about available wireless transceivers, network identification, signal strength, types of service, service terms, remaining benefits of a subscriber account, terms for termination of the account, device information, log-in history, credentials or data for encryption, for example.

Upon receiving credentials from the local network, the wireless device 102 may store the credentials in the SIM memory system. In order to access the credentials stored on the SIM memory system, the wireless device 102 may have to provide the SIM 104 a personal identification number to verify that the same wireless device uses the SIM 104 each time. The wireless device 102 may then transmit the credentials from the SIM 104 to the local mobile server systems 106. The local mobile server systems 106 may receive the credentials and allow the wireless device 102 access to transmit and receive data from the local mobile server systems 106. The subscription profile may include subscription information from a variety of networks covering different locations to allow a user to avoid roaming charges in areas in which the user has already purchased a plan. The subscription profile may allow a user to access local networks seamlessly when traveling between network coverage areas without worrying about roaming charges.

In one embodiment, the wireless device 102 may be configured to operate a mobile, wireless hotspot for other devices. The wireless device 102 may operate a local hotspot network used to connect a networked device 105 with the wireless device 102. For instance, the wireless device may make an ad hoc connection to a local mobile server systems 106 requiring a subscription and then wirelessly transmit information to the first networked device 105 or the second networked device 108 connected to the wireless device 102.

Upon contacting the local mobile server systems 106 in response to a request from the wireless device 102, the SFSS 107 may determine that a wireless device's subscription has ended or the subscription's credits or funds have been depleted. The SFSS 107 may offer the wireless device 102 to renew a subscription, to add credits and/or to add funds to the account of the wireless device 102. Upon receiving more funds from the wireless device 102, the SFSS 107 may reestablish a subscription with the local mobile server systems 106.

The second networked device 108 is a device that relies on the wireless device 102 to exchange data with a local mobile server systems 106. The second networked device may be any device that contains a traditional SIM device 109, including a cellular phone, for example. The second networked device 108 may have a traditional SIM device 109 which is limited to storing the K(s) assigned to the traditional SIM device 109 before the traditional SIM device 109 left the manufacturer. The traditional SIM device 109 may not be capable of storing new Ks, so the traditional SIM device 109 and the second networked device 108 may rely on the wireless device 102 and/or the SIM 104 to connect to a local mobile server systems 106 on an ad hoc basis.

Figure 1B:
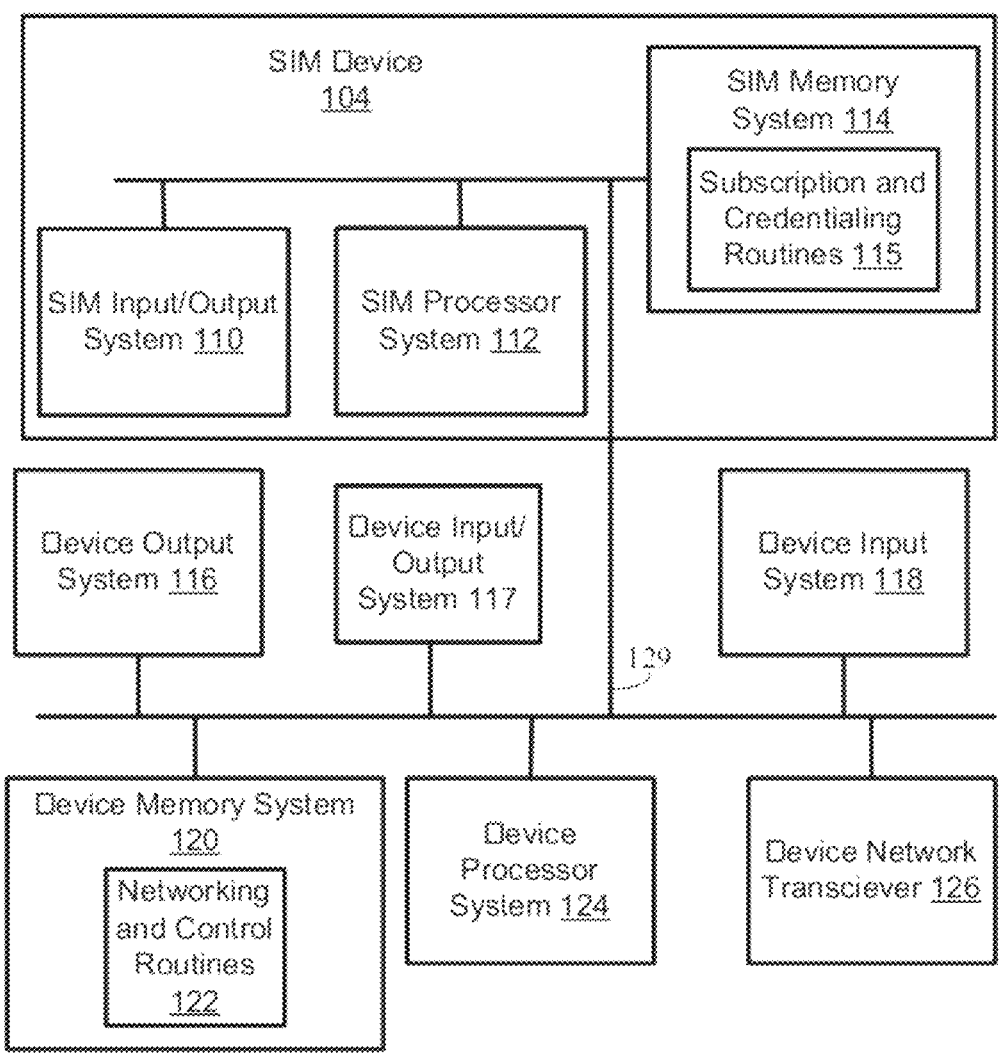
FIG. 1B shows a block diagram of an embodiment of the wireless device of FIG. 1A.

FIG. 1B shows a block diagram of an embodiment of the wireless device 102. The wireless device 102 may include a SIM device 104, SIM input/output system 110, SIM processor system 112, SIM memory system 114, subscription and credentialing routines 115, device output system 116, device input/output system 117, device input system 118, device memory system 120, device processor 122, device transceiver 126, optional user input 126, and networking and control routines 122. In other embodiments, the wireless device 102 may not have all of the elements listed and/or may have other elements in addition to or instead of those listed.

SIM device 104 was discussed above in FIG. 1A. The SIM output/input system 110 is a device which communicates between internal and external peripherals. The SIM input/output system ("SIOS") 110 may include a device or a plurality of devices that connect peripherals to the SIM 104. The SIOS 110 may be used to transmit data to peripherals and receive data from peripherals in order to accomplish subscription and credentialing objectives. The SIOS 110 may include any one of, some of, any combination of, or all of a display system, a speaker system, a connection or interface system to a sound system, an interface system to peripheral devices and/or a connection and/or an interface system to a computer system, intranet, and/or internet, an interface to receive image data, a microphone system, a pin out, and/or a wireless device 102 interface for example.

The SIM processor system ("SPS") 112 follows instructions stored in the SIM memory system to manage, store and transmit credential and subscription data in order to allow wireless devices 102 to connect to a local mobile server systems 106 on an ad hoc basis. The SPS may execute subscription and credentialing routines stored in the SIM memory system. The subscription and credentialing routines may include, for example, the subscription profile, the subscription manager, the credential manager, and the device drivers. One embodiment of the subscription and credentialing routines is explained in greater detail in FIG. 1E.

The SPS 112 may include any one of, some of, any combination of, or all of multiple parallel processors, a single processor, a system of processors having one or more central processors, a logic circuit and/or one or more specialized processors dedicated to specific tasks.

The SPS 112 may be configured (e.g., programmed or hardwired) to conduct the following activities: (1) receive credential data from a local mobile server systems 106 via the wireless device 102 in order to connect the wireless device 102 to the local mobile server systems 106 on an ad hoc basis, (2) store the credential data in the SIM memory system, (3) receive a personal identification number from the wireless device 102 in order to confirm that the SIM 104 should release its credentials to the wireless device 102, and/or (4) adjust the subscription profile stored in the SIM memory system to account for new subscriptions.

The SIM memory system ("SIMms") 114 is a component of the SIM 104, which stores data in order to allow a wireless device 102 to use the credential and subscription data stored in the SIMms 114 to connect to the local mobile server systems 106 on an ad hoc basis. The SIMms 114 may store subscription and credentialing routines 115. One embodiment of the subscription and credentialing routines is explained in greater detail in FIG. 1E. The SIMms 114 may store credentials received from local mobile server systems 106 resulting from a subscription created on an ad hoc basis. In addition to the subscription and credentialing routines 115, the SIMms 114 may also store variables, intermediates, results, constants, and the like necessary to execute the subscription and credentialing routines 115.

The SIMms 114 may include random access memory, electrically erasable programmable read only memory, and read only memory. The SIMms 114 may also include other memory devices, for example, any one of, some of, any combination of, or all of a long term storage system, such as a hard drive; a short term storage system; a removable storage system such as a disk drive, floppy drive or a removable drive; and/or flash memory. The SIMms 114 may include one or more machine readable media that may store a variety of different types of information. The term machine-readable media may be used to refer to any medium capable of carrying information that is readable by a machine. One example of a machine-readable medium is a computer-readable medium.

The device output system 116 may include any one of, some of, any combination of, or all of a display system, a printer system, a speaker system, a connection or interface system to a sound system, an interface system to peripheral devices and/or a connection and/or a interface system to a computer system, intranet, and/or internet, and the like. The device output system 116 may include a monitor and/or other output device. The device output system 116 may include an interface for sending output signals to the networked device 105 or the optional communications bus 129.

In one embodiment, the wireless device 102 may communicate image data with an optional display via the device output system 116. If the wireless device 102 offers a user the option of choosing a network to which the user may subscribe, the wireless device 102 may transmit data to display a list of networks with terms of subscription on the optional display.

Device input/output system 117 includes various devices that are used for both input and output, such as a touch screen, Universal Serial Bus (USB) port, a Wi-Fi interface, a 3G/4G interface.

The input system 118 may include an input pad, a touch screen, an interface to receive credential and subscription data, a microphone system, and/or a virtual keyboard (e.g., wireless device 102 may be portable device). In an alternative embodiment, input system 118 may include for example, any of, some of, any combination of, or all of an input for a keyboard system, an input for a mouse system, a track ball system, a track pad system, buttons on a handheld system, an input for a scanner system, a microphone system, a touchpad system, and/or a connection and/or interface system to a computer system, intranet, and/or internet (e.g., IrDA, USB). If wireless device is a netbook or a laptop, for example, input system 118 may include a keyboard, touchpad, trackball, mouse, and/or other cursor control device.

In an embodiment where the user selects the subscription used by the wireless device 102, the device input system 118 may receive instructions from user input This optional user input may be received from anything configured to receive data from a user including, for example, a keyboard, mouse, microphone, touch screen, or trackball. The user may use the optional user input to select the particular local network subscription that suits the user best.

The device memory system 120 may store algorithms and data for networking, subscribing to networks, credential management, and subscription management, for example. The device memory system 120 may include, for example, any one of, some of, any combination of, or all of a long term storage system, such as a hard drive; a short term storage system, such as a random access memory; a removable storage system such as a disk drive, floppy drive or a removable drive; and/or flash memory. The device memory system 120 may include one or more machine readable media that may store a variety of different types of information.

The device memory system 120 may include at least one memory device and may store the applications necessary to provide instructions to the network and control routines 122. The network and control routines 122 may include, for example, a wireless network detector, subscription profile, subscription manager, credential manager, connection routines, optional subscription value optimizer, and/or device drivers. The device memory system 120 may also store variables, intermediate values, final results, constants, and the like necessary to execute the networking and control routines 122. For instance, the device memory system 120 may store subscription profiles, data regarding credentials, or preconfigured settings for the wireless device 102 to select a network itself. In one embodiment, the device memory system 120 may serve as the SIM memory system in that the SIM 104 would be an application simulating a SIM 104 stored on the device memory system, which the device processor system executes.

The device processor system 122 executes algorithms including networking and control routines 122 stored in the device memory system 120. The device memory system 120 may store networking and control routines including, for example, a wireless network detector, a subscription profile, a subscription manager, a credential manager, connection routines, an optional value optimizer and device drivers. In other embodiments, the device memory system 120 may not have all of the elements listed and/or may have other elements in addition to or instead of those listed.

The wireless network detector is a module used to detect if there are any available local networks 106. The wireless network detector may be executed by the device processor 120 and the wireless network detector may detect via the device transceiver 126 available local networks 106. The wireless network detector may be configured to detect a routing network used to connect to the SFSS 107. The routing network may be the local mobile server systems 106.

The connection routines communicatively couple the wireless device 102 with networks, potentially including, for example, the SFSS 107 and the local network. The connection routines work with the device transceiver 126 to gain access to the local networks 106 and transmit data between the local networks 106 and the wireless device 102.

In one embodiment, the optional subscription value optimizer ("OSVO") is a module used to automatically determine the best local mobile server systems to which the wireless device 102 may connect. The OSVO may determine the best network based on preset, default configurations made by the SFSS 107. The OSVO may also determine the best network based on user defined settings provided by the user to the wireless device 102. The OSVO may not be present at all, and the available networks may be displayed to the user with terms of service in order that the user select local mobile server systems 106 each time the wireless device 102 connects to unsubscribed-to local mobile server systems 106.

Device drivers offer the wireless device general functionality. The device drivers allow the components of the wireless device 102 to function, the components including, for example, the device output system 116, device input system 118, device memory system 120, device processor 122, and device transceiver 126. The device drivers 192 may be executed by the wireless device 102 to allow the wireless device 102 to operate a hotspot network and connect with devices to make the devices networked devices.

Figure 1C:
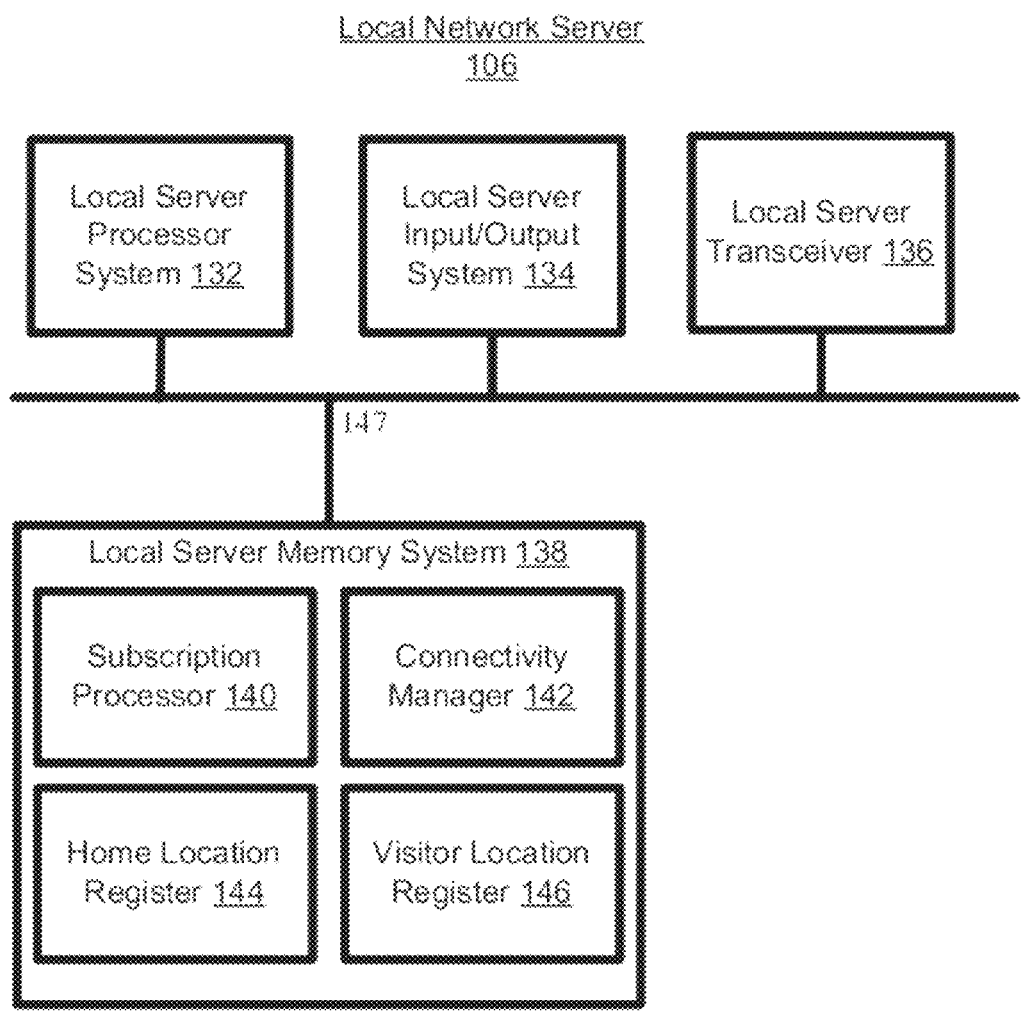
FIG. 1C shows a block diagram of an embodiment of a local mobile server systems of FIG. 1A.
Figure 1D:
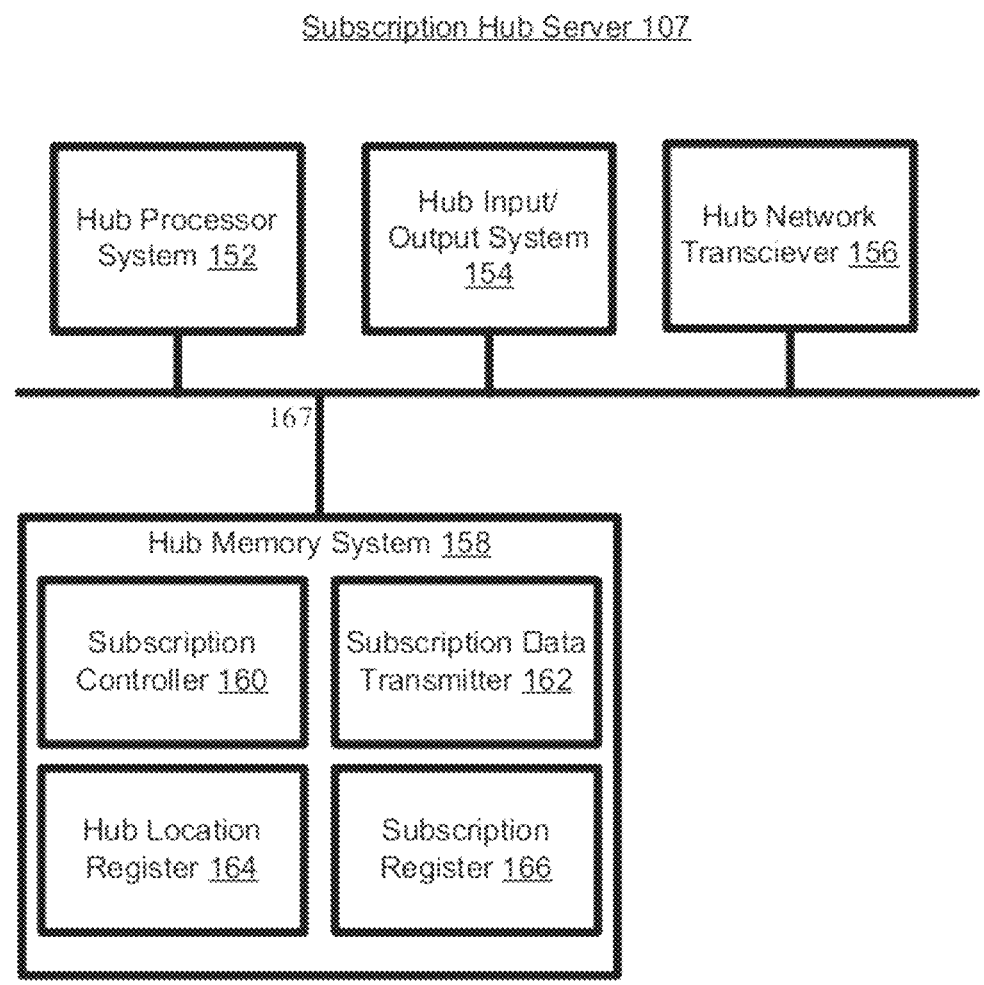
FIG. 1D shows a block diagram of an embodiment of a SFSS of FIG. 1A.
Figure 1E:
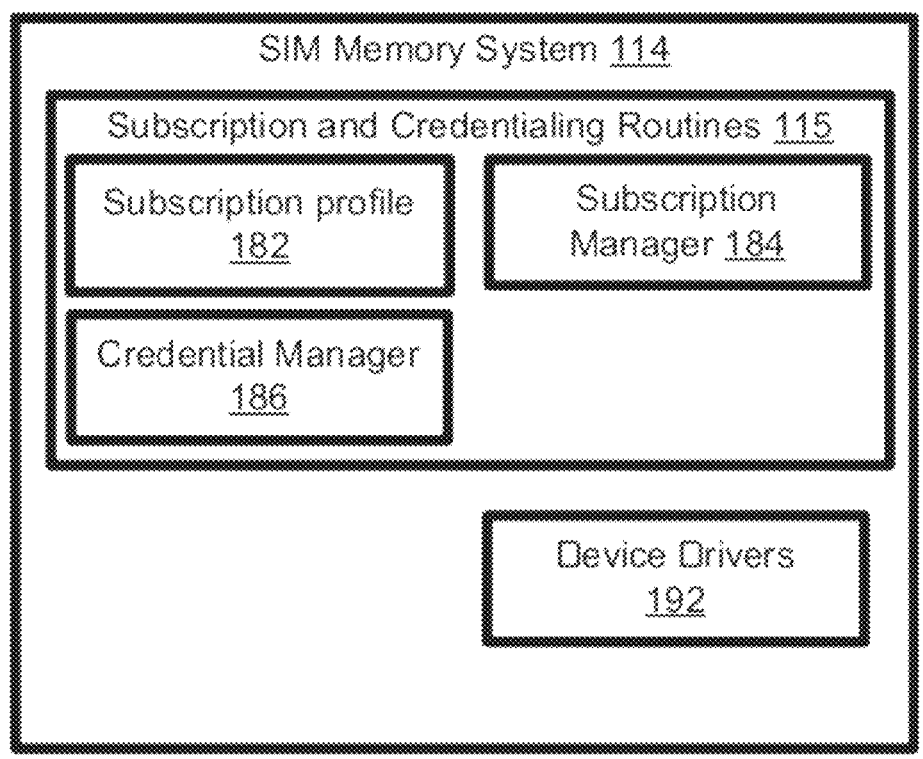
FIG. 1E shows a block diagram of an embodiment of the SIM memory system of FIG. 1A.

Examples of embodiments of the subscription profile, subscription manager, and credential manager are explained in greater detail in FIG. 1E.

Using the networking and control routines 122, the device processor system may execute instructions in the networking and control routines 122 in order to accomplish all, some or any of the following: (1) retrieve potential networks to which it can connect locally, (2) determine whether any local network is a subscribed-to network, (3) when determining there is no subscribed-to network, retrieving data from the SFSS 107 regarding local networks and the local networks' subscription terms, (4) optionally selecting the local mobile server systems 106 using an optional subscription value optimizer, (5) optionally displaying the available subscriptions and terms and allowing a user to select a subscription, (6) transmitting the selection to the SFSS 107 (7) receiving credentials to access the then subscribed-to network from the local network, (8) transmitting the received credentials to the SIMms 114, (9) updating the subscription profile in the SIM 104 to account for a new subscription, (10) Requesting credential data from the SIM 104 using a personal identification number, (11) Receiving from the SIM 104 credential data, (12) transmitting credential data to the local mobile server systems 106, 13. accessing the local network, (13) operating a local hotspot network to which other devices may connect as networked devices 105, and (14) requesting to renew or add credits or funds to an account, for example. These and other functions of the networking and control routines are described at greater length in the embodiment of the device memory system 120 in FIG. 1E.

The device processor system 122 may include any one of, some of, any combination of, or all of multiple parallel processors, a single processor, a system of processors having one or more central processors, a logic circuit and/or one or more specialized processors dedicated to specific tasks.

The device transceiver 126 is a data transmission device used to communicate data between the wireless device 102 and the SFSS 107 as well as the local mobile server systems 106. The transceiver device 124 includes both a transmitter and a receiver of wireless signals. The wireless signals may carry data including, for example, requests for data regarding local networks, credential data, subscription data, and/or subscription selection data. Transceiver device 124 may include an antenna. In an alternative embodiment, the transceiver may be a combination of a transmitter and receiver together. The device transceiver 126 may communicate with other networks and devices using any wireless protocol including Wi-Fi, WiMax, 2G, 3G, 4G, 4G LTE, UMTS, other satellite communication, or radio, for example.

The optional communications bus 129 is a communicative link between internal components of the wireless device 102. The optional communications bus 129 may be any communication medium capable of communicating data between components of a system. The optional communications bus 129 may communicatively couple the SIM device 104, SIOS 110, SPS 112, SIMms 114, device output system 116, device input/output system 117, device input system 118, device memory system 120, device processor system 124, and/or device network transceiver 126, for example.

FIG. 1C shows a block diagram of an embodiment of local mobile server systems 106. The local mobile server systems 106 may include a local server processor system 132, a local server input/output system 134, a local server transceiver 136, a local server memory system 138, a subscription processor 140, a connectivity manager 142, a home location register 144, a visitor location register 146 and an optional local communication bus 147. In other embodiments, the local mobile server systems 106 may not have all of the elements listed and/or may have other elements in addition to or instead of those listed.

The local server processor system ("LSPS") 132 executes the networking and subscription data and functions stored in the LNMS 138. Networking and subscription functions may include a subscription processor, connectivity manager, home location register, and visitor location register (all described in greater detail below).

The LSPS 132 may include any one of, some of, any combination of, or all of multiple parallel processors, a single processor, a system of processors having one or more central processors, a logic circuit and/or one or more specialized processors dedicated to specific tasks.

The local server input/output system ("LSIOS") 134 may be used to transmit data to peripherals and receive data from peripherals in order to accomplish networking and control objectives. The LSIOS 134 may include any one of, some of, any combination of, or all of a display system, a printer system, a speaker system, a connection or interface system to a sound system, an interface system to peripheral devices and/or a connection and/or an interface system to a computer system, intranet, and/or internet, a keyboard system, an interface to receive image data, a mouse system, a track ball system, a track pad system, buttons on a handheld system, a scanner system, a microphone system, a touchpad system, for example.

The LSIOS 134 may be used to receive administrator commands from the local server via a user input, for example, a keyboard. The LSIOS 134 may also be used to display images relevant to the workings of the local mobile server systems 106.

The local server transceiver 136 is a data transmission device used to communicate data between the wireless device 102 and the SFSS 107 as well as the local mobile server systems 106. The transceiver functions as a transmitter and receiver of data including, for example, requests for data regarding local networks, credential data, subscription data, and subscription selection data. In an alternative embodiment, the transceiver may be expressed as a transmitter and receiver separately. The local server transceiver 136 may communicate with other networks and devices using any wireless protocol including Wi-Fi, WiMax, 2G, 3G, 4G, 4G LTE, UMTS, other satellite communication, or radio, for example.

The local server memory system ("LSMS") 138 may store algorithms for managing subscriptions and transmitting data. The LSMS 138 may include, for example, any one of, some of, any combination of, or all of a long term storage system, such as a hard drive; a short term storage system, such as a random access memory; a removable storage system such as a disk drive, floppy drive or a removable drive; and/or flash memory. The LSMS 138 may include one or more machine readable media that may store a variety of different types of information. The term machine-readable media may be used to refer to any medium capable of carrying information that is readable by a machine. One example of a machine-readable medium is a computer-readable medium.

The LSMS 138 is used to store the applications and data necessary to provide instructions in order to execute networking and subscription functions on the local mobile server systems 106. The LSMS 138 may include at least one memory device and may store networking and subscription routines. Networking and subscription routines may include a subscription processor 140, a connectivity manager 142, a home location register 144, and a visitor location register, for example.

The subscription processor 140 manages all subscription functions on the local mobile server systems 106. The subscription processor 140 may be a routine for a processor to execute in order to transmit data regarding services and terms of service to the SFSS 107, store appropriate identification and subscription data to the LNMS 138, transmit credentials and subscription data to the wireless device 102, the SIM device 104 and the SFSS 107, create a subscription file when a user or wireless device 102 attempts to access the local network, store the subscription profile in either the home location register or the visitor location register, transfer subscription and identification information from the visitor location register to the home location register when a subscription is established, recharged or renewed, determine if a subscription is current or has sufficient funds or credits for access to the local mobile server systems 106, and receive instructions to renew a subscription or add credits or funds to an account, for example. The subscription processor controls all subscriptions used to access the local mobile server systems 106

The connectivity manager 142 determines whether wireless devices 102 should have access to the local mobile server systems 106. The connectivity manager 142 receives credentials from wireless devices 102 in order to determine whether the wireless devices 102 have the credentials to enter the network securely and under an expected contract. Connectivity manager 140 may receive the credentials from the wireless device 102 and compare them to the credentials stored in the network server 106's home location register. These credentials may include an IMSI, encryption key or a K, for example. If the credentials are correct and up-to-date, the connectivity manager 142 may allow the wireless device 102 to connect to the local network of network server 106. In one embodiment, the connectivity manager 142 may be authentication center used by the local mobile server systems 106 to authenticate a wireless device 102 or SIM 104 of wireless device 102.

The Home Location Register ("HLR") 144 stores subscription data and credentials in order to show that a user or device has a subscription that is current. Subscription profiles stored on the HLR 144 are considered to belong to users or devices that are subscribed to the local network of network server 106.

The Visitor Location Register ("VLR") 146 stores subscription profiles of users or wireless devices 102 who/which do not have a current subscription. When a wireless device 102 or a user attempts to access the local network of local mobile server systems 106 without a subscription, the subscription processor 140 may create a subscription profile and store it in the VLR 146.

The LNMS 138 may also store variables, intermediates, results, constants, and the like necessary to execute the networking and subscription routines. For instance, the LMNS 138 may store any intermediates used in the process of confirming that the credentials of a wireless device 102 match those of a subscription profile stored in the HLR 144.

The optional local communications bus 147 is a communicative link between internal components of the local mobile server systems 106. The optional communications bus 147 may be any communication medium capable of communicating data between components of a system. The optional communications bus 129 may communicatively couple the LSPS 132, the LSIOS 134, the local network transceiver 136, and the LSMS 138, for example.

The local mobile server systems 106 may include any number of computing devices.

FIG. 1D shows a block diagram of an embodiment of a SFSS 107. The SFSS 107 operates as a central server for a central network to which varieties of local networks connect and offer terms for local subscription. The SFSS 107 may include a SFSS processor system 152, a SFSS input/output system 154, a SFSS transceiver 156, a SFSS memory system 158, a subscription controller 160, a subscription data transmitter 162, a SFSS location register 164, a subscription register 166, and an optional SFSS communications bus 167. In other embodiments, the SFSS 107 may not have all of the elements listed and/or may have other elements in addition to or instead of those listed.

The SFSS processor system ("SFPS") 152 executes instructions in order to allow a wireless device 102 to receive a subscription to a local network to avoid roaming charges. The SFPS 152 may include at least one processor device and may be configured to execute SFSS functions including, for example, a subscription controller, a subscription data transmitter, a SFSS location register, and a subscription register stored in the SFSS memory system (the SFSS functions are explained in greater detail below).

The SFPS 152 may include any one of, some of, any combination of, or all of multiple parallel processors, a single processor, a system of processors having one or more central processors, a logic circuit and/or one or more specialized processors dedicated to specific tasks.

The SFSS input/output system ("SFIOS") 154 is a device or devices that connect peripherals to the SFSS 107. The SFIOS 154 may be used to transmit data to peripherals and receive data from peripherals in order to accomplish networking and control objectives. The SFIOS 154 may include any one of, some of, any combination of, or all of a display system, a printer system, a speaker system, a connection or interface system to a sound system, an interface system to peripheral devices and/or a connection and/or an interface system to a computer system, intranet, and/or internet, a keyboard system, an interface to receive image data, a mouse system, a track ball system, a track pad system, buttons on a handheld system, a scanner system, a microphone system, a touchpad system, for example.

The SFIOS 154 may be used to receive administrator commands from the local network via a user input, for example, a keyboard. The SFIOS 154 may also be used to display images relevant to the workings of the SFSS 107.

The SFSS transceiver 156 is a data transmission device used to communicate data between the SFSS 107 and the wireless device 102 as well as the local mobile server systems 106. The SFSS transceiver 156 may include a transmitter and receiver, which transmit and received of data including, for example, requests for data regarding local networks, credential data, updated subscription data, and subscription selection data. In an alternative embodiment, the transceiver may be a combination of a transmitter and receiver. The local network transceiver 136 may communicate with other networks and devices using any wireless protocol including Wi-Fi, WiMax, 2G, 3G, 4G, 4G LTE, UMTS, other satellite communication, or radio, for example.

The SFSS memory system ("SFMS") 158 stores subscription data and SFSS functions. The SFMS 158 may include, for example, any one of, some of, any combination of, or all of a long term storage system, such as a hard drive; a short term storage system, such as a random access memory; a removable storage system such as a disk drive, floppy drive or a removable drive; and/or flash memory. The SFMS 158 may include one or more machine readable media that may store a variety of different types of information. The term machine-readable media may be used to refer to any medium capable of carrying information that is readable by a machine. One example of a machine-readable medium is a computer-readable medium.

The SFMS 158 is used to store the applications and data necessary to execute SFSS functions on the SFSS 107. SFSS functions may include a subscription controller 160, a subscription data transmitter 162, a SFSS location register 164, and a subscription register, for example.

The subscription controller 160 manages all of the subscription operations between the wireless device 102 and the local mobile server systems 106. The subscription controller 160 may be executed by the HPS 152 in order to manage subscriptions. The subscription controller 160 may manage receipt of current available services and terms of service from the local mobile server systems 106 and store them in the SFSS location register. Upon receipt of a request to subscribe to a local network from a wireless device 102, the subscription controller 160 may request from the local mobile server systems 106 to transfer subscription information and network credentials to the wireless device 102 and the SIM 104. Upon confirmation of the subscription, the subscription controller 160 may receive, from the local mobile server systems 106, subscription information for a particular wireless device 102 and store the subscription information in the subscription register.

In the event that a subscription is not current or the credits or funds of the subscription have been depleted, the subscription controller 160 may also be configured to notify the wireless device that a new transaction must occur to renew the subscription. The subscription controller 160 may receive funds in order to renew a subscription. The subscription controller 160 may write data reflecting a renewed subscription to the subscription register when a subscription is renewed.

In one embodiment, the subscription controller 160 may be responsible for communications and transactions between the local mobile server systems 106 and the wireless device 102. For instance, all monies, subscription information and credentials may transfer between the wireless device 102 and the local mobile server systems 106, via the SFSS 107.

The subscription data transmitter 162 transmits subscription data, including a subscription profile 160 between the wireless device 102, the local mobile server systems 106 and the SFSS 107. The subscription data transmitter 162 may transmit messages with an encryption to ensure security.

The SFSS location register 164 stores data regarding which services and terms of service are available in any particular area. For instance, the SFSS location register 164 may store data representing that a network called Mercury, located in Zimbabwe, may have a plan for a month with 300 minutes of talk time and 50 gigabytes of data transfer. The SFSS location register 164 may receive information about services and terms of service from the local networks 106 in various locations. The SFSS location register 164 may store a number of networks for a particular location and may store different service plans for each network. In one embodiment, the SFSS location register 164 may be a services directory called an available plans database.

The subscription register 166 is the record the SFSS keeps of a particular user or wireless device's 102 subscriptions and credentials. The subscription register 166 may contain the subscription profile 160, which itself may contain all of the data regarding the networks to which the wireless device 102 or user is subscribed. The subscription register can be used by the SFSS 107 to determine at the outset whether a user has a local subscription in a particular locale.

The optional SFSS communications bus 167 is a communicative link between internal components of the local mobile server systems 106. The optional SFSS communications bus 167 may be any communication medium capable of communicating data between components of a system. The optional communications bus 167 may communicatively couple the HPS 152, SFIOS 154, SFSS network transceiver 156, and SFMS 158, for example.

FIG. 1E shows a block diagram of an embodiment of the SIM memory system 114. The SIM memory system 114 may have subscription and credentialing routines 115 including, for example, a subscription profile 182, a subscription manager 184, and a credential manager 186. The SIM memory system 114 may also include device drivers 192. In other embodiments, the SIM memory system 114 may not have all of the elements listed and/or may have other elements in addition to or instead of those listed.

The subscription profile 182 is data that represents the different subscriptions and credentials a wireless device (e.g., wireless device 102) may use to connect to networks. The subscription profile 182 may contain data including the device's location, information about available wireless transceivers, network identification, signal strength, types of service, service terms, remaining benefits of a subscriber account, terms for termination of the account, device information, log-in history, or data for encryption, for example.

The subscription manager 184 is responsible for all subscription services within the SIM 104. The subscription manager 184 may be executed by the SPS 112 to manage the wireless device's 102 subscriptions. The subscription manager 184 may be configured to create, maintain, and transmit subscription information found in the subscription profile 182.

When the wireless device 102 searches for local subscribed-to networks, wireless device 102 may utilize the subscription manager 184 to search through the subscription profile 182 to determine if any of the local networks of the local mobile server systems 106 are subscribed-to. When subscribing to a new network, the subscription manager 184 may update the subscription profile 182 with the terms of the new subscription and the locations where the subscription is valid. The subscription manager 184 may transmit the subscription profile 182 to the SFSS 107 and the local mobile server systems 106 when a user or wireless device 102 subscribes, in order to update the subscription register 166, HLR 144, and VLR 146.

The subscription manager 184 may also detect that a subscription is no longer current, that an account for the subscription no longer has any credits, or funds. In response to a payment to make the subscription effective, the subscription manager 184 may adjust the subscription profile 182 in order to account for the new terms of the subscription. The subscription manager 184 may also transmit the updated subscription profile 182 to the SFSS 107 and the local mobile server systems 106 in order to update the subscription register 166, HLR 144 and VLR 146.

The credential manager 186 is responsible for managing the credentials of the SIM 104 and/or the wireless device 102. The credential manager 186 updates the subscription profile 182 whenever the list of credentials changes. Credentials may change when the user or wireless device 102 subscribes to a new network. In one embodiment, the credentials may change whether for want of funds or credits or by failing to keep the subscription current, each time a subscription becomes ineffective.

The credential manager 186 is also responsible for providing credentials when trying to access a network. The credential manager 186 may provide credentials for a subscribed-to network and gain access. The credential manager 186 may also transmit credentials to an unsubscribed-to network, likely leading to a failed log-in attempt. The credential manager 186 may provide credentials to recently subscribed-to local mobile server systems 106 and in doing so, likely gain access to the recently subscribed-to local mobile server systems 106.

Device drivers 192 offer the wireless device 102 general functionality. The device drivers 192 allow the components of the wireless device 102 to work, including, for example, the device output system 116, device input system 118, device memory system 120, device processor 122, and device transceiver 126. The device drivers 192 may be executed by the wireless device 102 to allow the wireless device 102 to operate a hotspot network, via wireless device 104, and connect with devices to make the devices networked devices.

Figure 2:
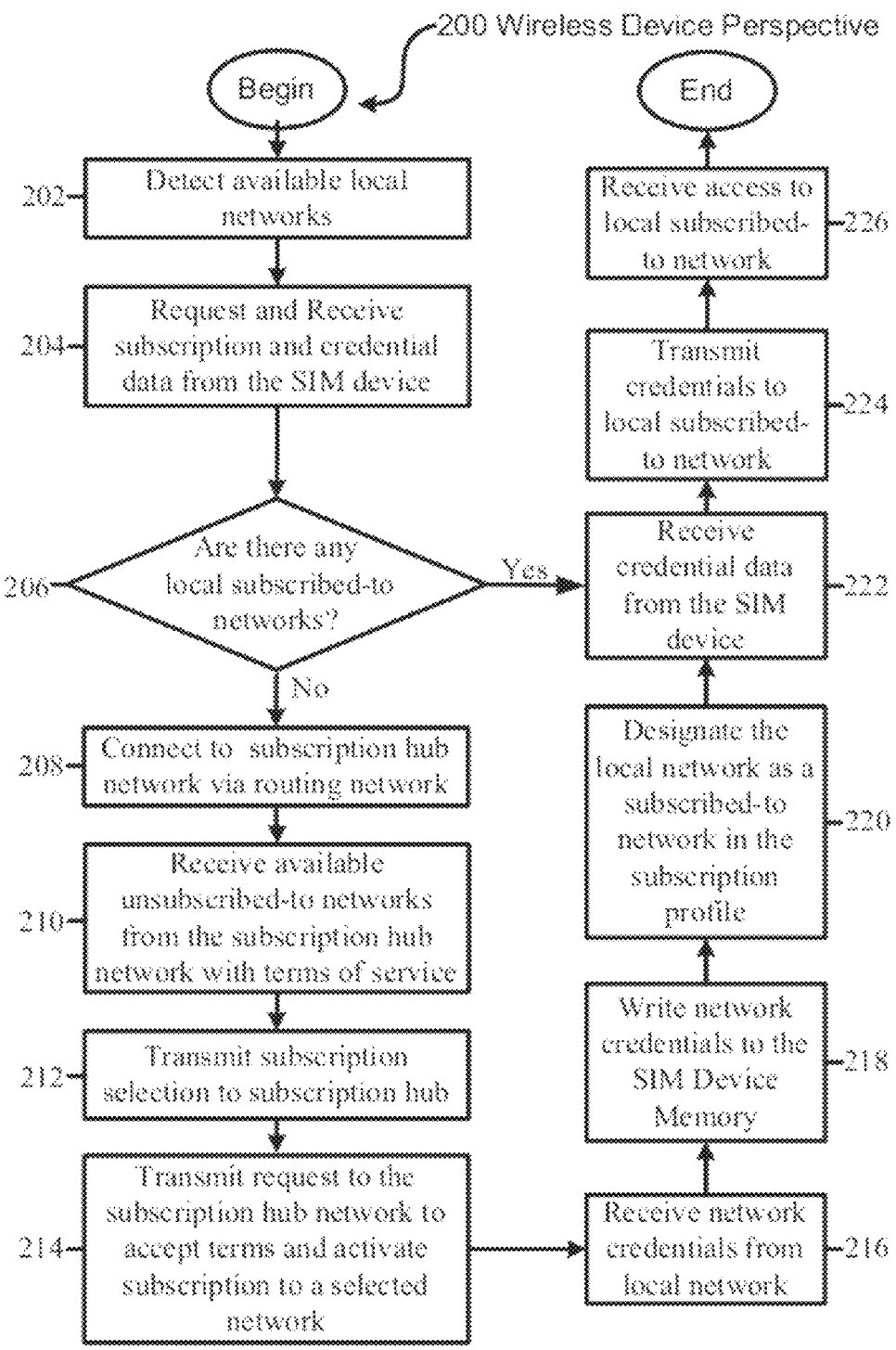
FIG. 2 shows a flowchart of an embodiment of a method for obtaining and managing subscriptions for accessing wireless networks on an ad hoc basis from the perspective of the wireless device of FIGS. 1A and 1B.

FIG. 2 shows a flowchart of an embodiment of a method 200 for obtaining and managing subscriptions for accessing wireless networks on an ad hoc basis. Method 200 is performed by wireless device 102. In this embodiment, the wireless device 102 may attempt to contact the SFSS 107 in order to establish a subscription with a local network and avoid roaming charges. In step 202, the wireless device 102 detects available networks. The wireless device 102 may use the device transceiver 126 to transmit requests for data regarding local networks 106 to see if any of the local networks 106 are subscribed-to networks.

In step 204, the wireless device 102 requests and receives subscription and credential data from the SIM 104. The wireless device 102 may make a request to receive subscription data to try to find a local network to which the wireless device 102 has a subscription using the subscription manager 184. The wireless device 102 will need credentials to authenticate its identity, so it may transmit a personal identification number to the SIM 104 using the credential manager 186, allowing the SIM 104 to transmit the credential data to the wireless device 102.

In step 206, the wireless device 102 determines if there are any local subscribed-to networks. If there are subscribed-to local mobile server systems 106, the wireless device 102, method 200 may proceed to step 222 (and receive credential data from the wireless device 102 at step 222, which will be discussed below). If there are no subscribed-to local mobile server systems 106, the wireless device 102 may attempt to connect to a local network on an ad hoc basis. To begin, the wireless device may connect to the SFSS 107, via a routing network at step 208.

In step 208, the wireless device 102 connects to the SFSS 107, via a routing network. The routing network is a network used to connect to the SFSS 107. The routing network may be any type of network including the local mobile server systems 106, a Wi-Fi network locally, or a WiMax network locally, for example. In embodiments in which an unsubscribed-to network is used to initially gain a new subscription, the user may have to pay roaming charges to connect to the SFSS 107. Alternatively, the wireless device 102 may use alternative channels to establish a subscription including, unstructured supplementary data ("USSD") protocols, short message service ("SMS") protocols with the roaming profile, or other Internet protocol ("IP") communication channels, for example.

In step 210, the wireless device 102 requests and receives data representing available unsubscribed-to local networks and the networks' available services and terms of subscription which can be used on an ad hoc basis from the SFSS 107. The request may account for user preferences indicated in advance. For instance, the user may only want plans with unlimited data and can allow a preliminary filter to not subscribe to networks that fail to offer unlimited data transfer.

The wireless device 102 receives the network data from the SFSS 107. The SFSS 107 may transmit data regarding available services and terms of service for networks configured to give network access to the wireless device 102 in a particular location. The SFSS 107 may provide this information consistent with agreements made between the entity controlling the SFSS 107 and the local mobile server systems 106 to provide credentials for connectivity on an ad hoc basis.

In step 212, the wireless device 102 transmits data representing the local mobile server systems 106 selection. In one embodiment, the wireless device 102 makes the selection automatically using the optional subscription value optimizer 190. The optional subscription value optimizer 190 may determine the best value for a subscription by established user preferences, default factory settings, firmware which can be updated, or by any mathematical algorithm, for example. In an alternative embodiment, the user may select the subscription plan and network that best suits the user. In this embodiment, the wireless device 102 may have an optional display 122 in order to list services and terms of service for the user to select. The wireless device 102 may also have an optional user input 126 to allow the user to select a plan.

In step 214, the wireless device 102 transmits a request to the SFSS 107 to accept terms and activate the subscription to selected local mobile server systems 106 on an ad hoc basis. The acceptance may include an electronic signature signifying that a wireless device 102 user has accepted the terms of service. This message may be encrypted in order to protect confidential information. In an alternative embodiment, the SFSS 107 may not be involved in the transaction beyond the provision of data representing available local networks and the networks' terms of service to the wireless device 102. In this alternative embodiment, the local mobile server systems 106 receive the request directly instead of via the SFSS 107.

In step 216, the wireless device 102 receives network credentials from the local mobile server systems 106. The wireless device may receive data representing the credentials necessary to access the local mobile server systems 106 using the credential manager 186.

In step 218, the wireless device writes the credentials to the SIMms 114. In another embodiment, the credentials may be stored on the device memory system 120 or a SIM 104 which may or may not be integrated with the wireless device 102. The credentials may include a K, an IMSI, location data, or any other subscriber identifier, for example.

In step 220, the wireless device 102 designates the local mobile server systems 106 as a subscribed-to network. Designating the local mobile server systems 106 as a subscribed-to local mobile server systems 106 may require that the subscription manager 184 adjust the subscription profile 182 to account for the new subscription. In designating the local mobile server systems 106 as a subscribed-to network, the wireless device 102 may access the local network as if the local mobile server systems 106 were the wireless device's primary network. The designation of the local mobile server systems 106 as a subscribed-to network may cause the wireless device 102 to adjust the subscription profile 182 of wireless device 102 to account for the fact that wireless device 102 is subscribed to the local mobile server systems 106.

After step 220 or as a result of a determination that there are local subscribed-to networks in step 212, method 200 proceeds to step 222. In step 222, the wireless device 102 receives credential data from the SIM 104. The wireless device 102 may require a personal identification number ("PIN") in order to access the credentials stored in the SIM 104.

In step 224, the wireless device 102 transmits credentials to the subscribed-to local mobile server systems 106. The wireless device 102, in order to gain access to the secured local mobile server systems 106, may have to log in using credentials supplied on an ad hoc basis by the local mobile server systems 106.

In one embodiment, the transmission of credentials may be a multistep process. For instance, the local mobile server systems 106 may search the database of the local mobile server systems 106 for the incoming IMSI and the K associated with the database. Then, the operator may generate a random number ("RAND") and signs it with the K associated with the IMSI, computing a first signed response number ("SRES_1"). The operator network then sends the RAND to the wireless device 102 or to SIM 110 of wireless device 102. The wireless device 102 or the SIM 110 signs the RAND with the K of the wireless device 102 producing a second signed response ("SRES_2"), which is sent back to the local mobile server systems 106 with an encryption key ("$K_g$"). The local mobile server systems 106 compare the SRES_1 and SRES_2 and if SRES_1 and SRES_2 sent by wireless device 102 satisfy predetermined criteria (for instance, they can match), the wireless device 102 and/or its SIM 104 is authenticated.

In step 226, the wireless device 102 receives access to the subscribed-to, local mobile server systems 106. Upon the wireless device transmitting valid credentials on an account with a current subscription or that has sufficient funds or credits for use, the local mobile server systems 106 should grant the wireless device 102 access.

Once the wireless device 102 has access, the wireless device 102 may be able to operate a mobile hotspot network in order to allow networked devices 105 to connect to the local mobile server systems 106 via the hotspot network.

In an embodiment, each of the steps of the method shown in FIG. 2 is a distinct step. In another embodiment, although depicted as distinct steps in FIG. 2, steps 202-226 may not be distinct steps. In other embodiments, the method shown in FIG. 2 may not have all of the above steps and/or may have other steps in addition to or instead of those listed above. The steps of the method shown in FIG. 2 may be performed in another order. Subsets of the steps listed above as part of the method shown in FIG. 2 may be used to form their own method.

Figure 3:
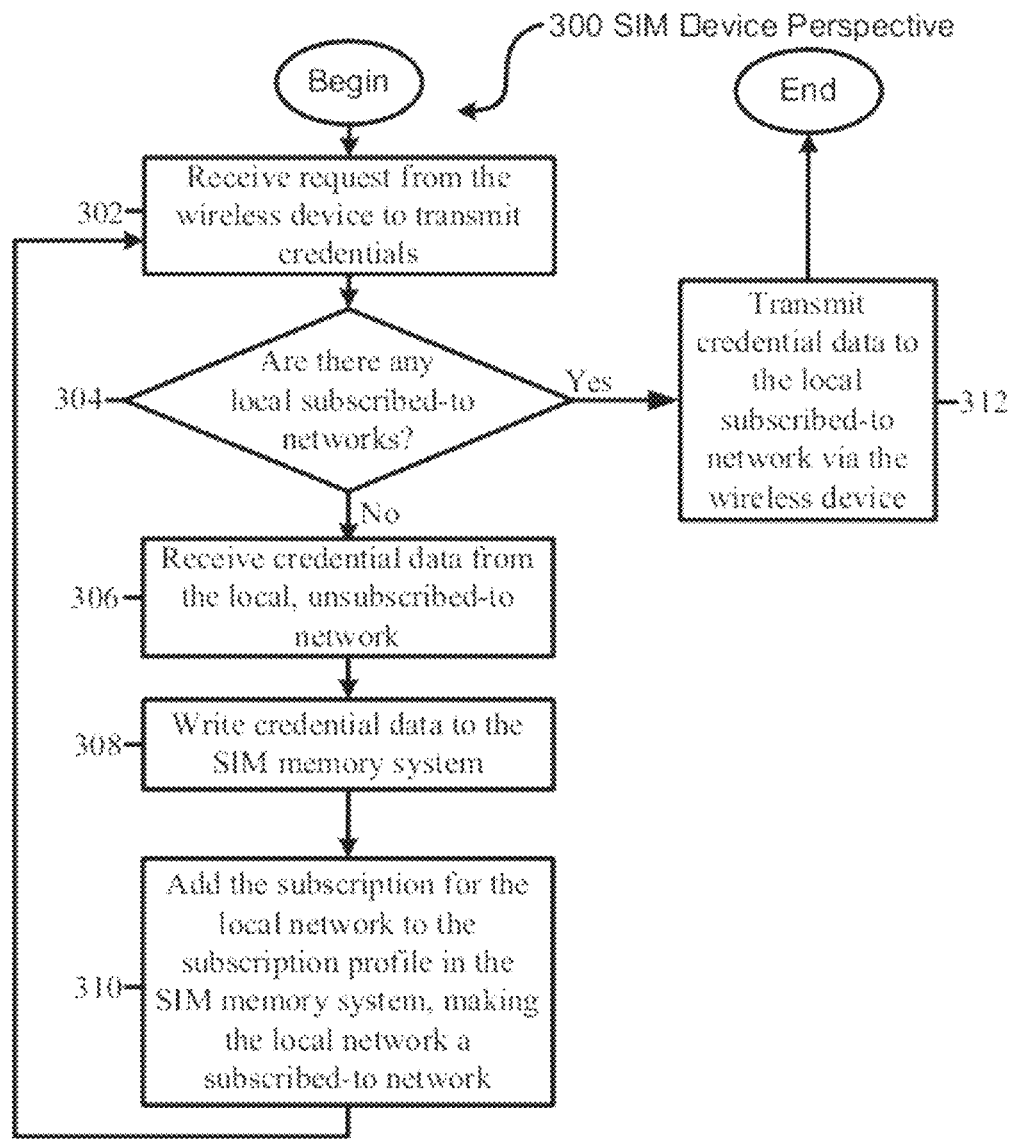
FIG. 3 shows a flowchart of an embodiment of a method for obtaining and managing subscriptions for accessing wireless networks on an ad hoc basis from the perspective of the SIM device of FIGS. 1A and 1B.

FIG. 3 shows a flowchart of an embodiment of a method 300 for obtaining and managing subscriptions for accessing wireless networks on an ad hoc basis. Method 300 may be a complementary method to method 200, which is performed by SIM device 104. In an embodiment, the SIM 104 may receive, store and transmit credentials for accessing local mobile server systems 106 on an ad hoc basis.

In step 302, the SIM 104 receives a request from the wireless device 102 to transmit credentials. In order to receive credentials from the SIM 104, the wireless device 102 may transmit a PIN to the credential manager 186 of the SIM 104, so as to verify that the wireless device 102 is associated with the SIM 104.

In step 304, it is determined whether there are any unsubscribed-to local networks 106. The determination may be by made by any, all, none, or some of the SFSS 107, wireless device 102, local mobile server systems 106, and routing network, for example, by consulting a subscription profile 182, HLR 144, or subscription register 166, using a subscription manager 184, subscription processor 140, or a subscription controller 160, respectively. If it is determined that there is a subscribed-to local mobile server systems 106, method 300 proceeds to step 312, where the SIM 104 may transmit credential data to the subscribed-to local mobile server systems 106 at step 312 (which is discussed further below in step 312). If it is determined that there is no subscribed-to local mobile server systems 106, the SIM 104 receives credential data from the unsubscribed-to local mobile server systems 106.

In step 306, the SIM 104 receives credential data from the unsubscribed-to local device 106. The credential manager 186 may receive the credential data. The credential data may include a K, IMSI, location data, and an encryption key, $K_c$.

In step 308, the SIM 104 writes the credential data to the SIMms 114. The credential data may be written to the SIM 104 using the credential manager 186. In an alternative embodiment, the SIMms 114 may be integrated with a memory device of the device memory system 120, so the credentials could be stored in the device memory system 120. The SIM 104 may also be entirely integrated into the wireless device 102 such that the SIM 104 is simulated by an application stored on the device system memory 120.

In step 310, the SIM 104 adds the subscription for the local mobile server systems 106 to the subscription profile 182 in the SIMms 114, making the local mobile server systems 106 subscribed-to local mobile server systems 106. The SIM 104 may adjust the subscription profile 182 of SIM 104 using the subscription manager 184 to account for any added subscriptions, renewed subscriptions, expired subscriptions, depleted accounts, and newly recharged accounts, for example.

Returning to step 304, if it is determined during step 304 that there is a subscribed-to local mobile server systems 106, method 300 proceeds to step 312. In step 312, the SIM 104 transmits credential data to the subscribed-to local mobile server systems 106, via the wireless device 102. Upon receiving the credential data from the SIM 104, the wireless device 102 may transmit credential data to access the local mobile server systems 106. The wireless device 102 may then receive access to the local mobile server systems 106 and, optionally, operate a hot spot to connect with other networked devices 105.

In an embodiment, each of the steps of the method shown in FIG. 3 is a distinct step. In another embodiment, although depicted as distinct steps in FIG. 3, steps 302-312 may not be distinct steps. In other embodiments, the method shown in FIG. 3 may not have all of the above steps and/or may have other steps in addition to or instead of those listed above. The steps of the method shown in FIG. 3 may be performed in another order. Subsets of the steps listed above as part of the method shown in FIG. 3 may be used to form their own method.

Figure 4:
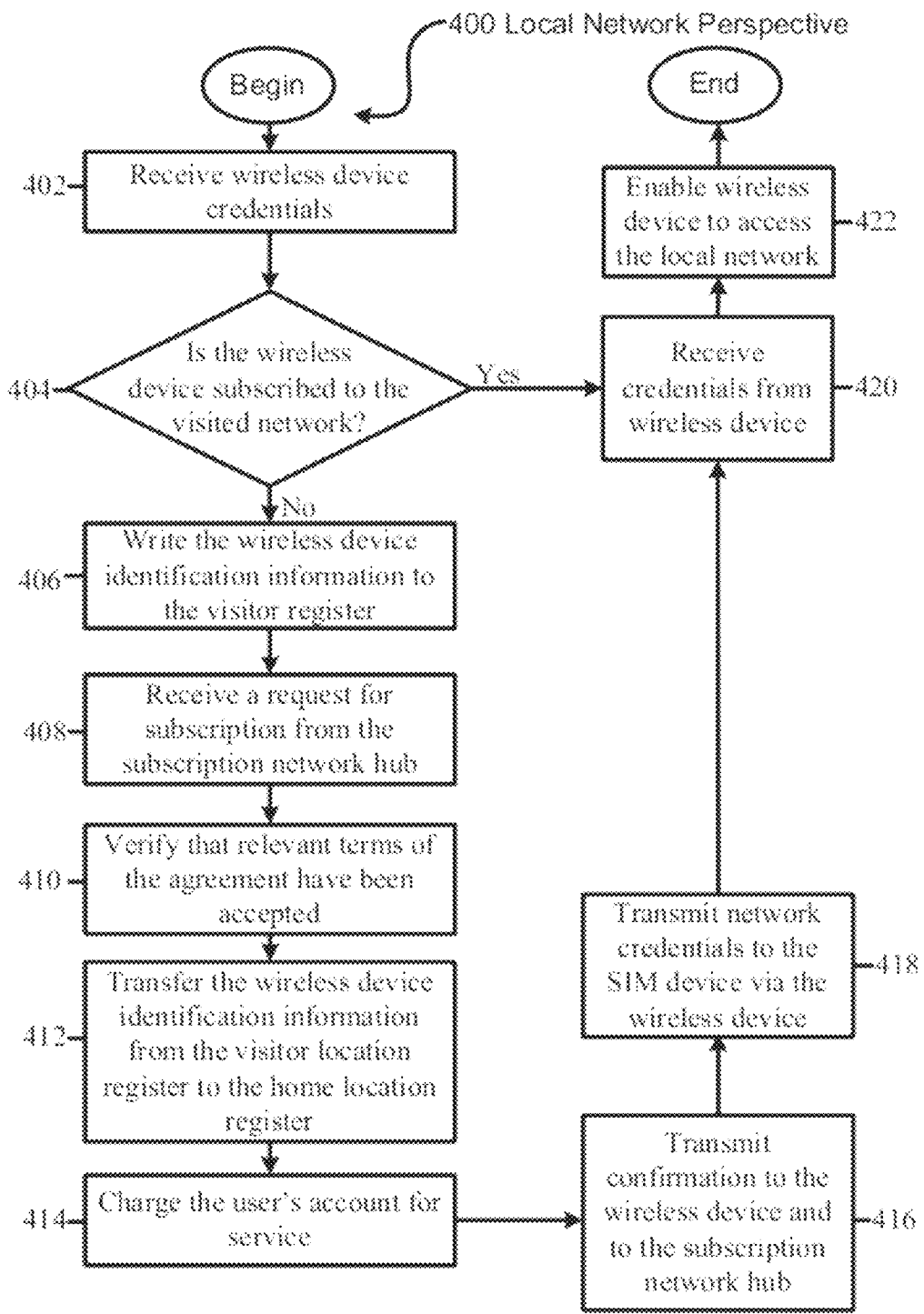
FIG. 4 shows a flowchart of an embodiment of a method for obtaining and managing subscriptions for accessing wireless networks on an ad hoc basis from the perspective of the server of the visited network of FIGS. 1A and 1C.

FIG. 4 shows a flowchart of yet another embodiment of a method for obtaining and managing subscriptions for accessing wireless networks on an ad hoc basis. In this embodiment, local mobile server systems 106 may allow a wireless device 102 to subscribe and access the local mobile server systems 106. In step 402, the local mobile server systems 106 receives the wireless device's 102 credentials. These credentials may have any elements of the subscription profile 182, including, for example, the IMSI and the K. The K is typically a secret encryption key that is only known by the SIM 104 and the local network's home location register 144. Therefore, it may be beneficial to encrypt the K and even the IMSI before transferring data representing the K and IMSI.

In step 404, it is determined whether the wireless device 102 is subscribed to a local mobile server systems 106. The determination may be done by any, some or all of the wireless device 102, SFSS 107, and local mobile server systems 106. The subscription profile 182 may contain data describing whether the subscription is current and still has credits. Storing information about whether the subscription is current may allow the wireless device 102 to determine on its own whether the wireless device is subscribed to the local mobile server systems 106. If the determination of whether the wireless device 102 is subscribed to the local mobile server systems 106 is made by the local mobile server systems 106, the connectivity manager 142 could determine if the wireless device 102 has a subscription to the local mobile server systems.

If the wireless device 102 is subscribed to the local mobile server systems 106, the wireless device 102 may transmit credentials at step 420. If the wireless device 102 does not have a subscription, the local mobile server systems 106 may write the wireless device 102 identification information to the visitor location register 146 at step 406.

In step 406, the local mobile server systems 106 write the identification information of wireless device 102 to the visitor location register 146. The identification information may include all, some, or none of the elements stored in the subscription profile 182. The visitor location register 146 maintains the information of unsubscribed users who potentially, by default, may have to pay roaming charges to access the local mobile server systems 106.

In step 408, the local mobile server systems 106 receive a request for subscription on an ad hoc basis from the SFSS 107. The SFSS 107 may transmit data representing the subscription selections made by either the user or wireless device 102 and an acceptance of terms of service. The SFSS 107 may also transmit the information about the wireless device 102 necessary for the wireless device 102 to connect to the local mobile server systems 106, for example, which may include information necessary to have the hardware of the wireless device 102 and the local mobile server systems 106 act compatibly.

In step 410, the local mobile server systems 106 verify that any essential terms of the ad hoc subscription agreement have been accepted by the wireless device 102 or the wireless device's user. The terms of the ad hoc subscription may be for a particular duration of time or may simply be credits or funds remaining in a user or device account. The agreement may stipulate the payment terms, the term of the contract, and the locations in which the contract applies, for example.

In step 412, the local mobile server systems 106 transfer the identification information of wireless device 102 from the visitor location register 144 to the home location register 146. The subscription processor 140 may be responsible for transferring the identification information of wireless device 102 from the VLR 144 to the HLR 146. The transfer of the identification information may indicate to the local mobile server systems 106 that the wireless device 102 or user is now a subscriber and that therefore should be allowed to access the local mobile server systems 106 provided the user or wireless device 102 can supply current credentials.

In step 414, the local mobile server systems 106 charge the user account for service. The charging may occur at an account that the user of the wireless device 102 has with the entity that controls the SFSS 107. The charging may also occur at an account that the wireless device 102 (or the user) establishes with local mobile server systems 106 when subscribing. Also, the user or device may not have a dedicated account with the SFSS 107 or the local mobile server systems 106. In that embodiment, the user or wireless device 102 may be charged directly by any payment method including, for example, charging a checking account, savings account, debit account, trust account, gas account, expense account, government agency account or credit card account.

In step 416, the local mobile server systems 106 transmit the confirmation of the ad hoc subscription to the wireless device 102 and the SFSS 107. The SFSS 107 and wireless device 102 are notified that the subscription has been created and prepare to receive the credentials. In one embodiment, the SFSS 107 may not be notified of the subscription directly by the local mobile server systems 106, but may receive the confirmation via the wireless device 102 or another routing network.

In step 418, the local mobile server systems 106 transmit network credentials to the wireless device 102. The credentials may be further transmitted to, and stored in, the SIM 104 using the credential manager 186. The wireless device 102 needs the credentials in order to access the local subscribed-to local network of network server 106. The credentials may include an IMSI and a K, which may be closely guarded secrets, so the credentials may be transmitted with encryption in order to increase security.

In step 420, the local mobile server systems 106 receive the credentials from the wireless device 102. The credentials may come from a wireless device 102 that has just subscribed or had a subscription before the method was effectuated. Either way, the wireless device 102 may transmit credentials in order to gain access to the local mobile server systems 106.

In one embodiment, the receipt of the credentials at local mobile server systems 106 may be a multistep process. For instance, the wireless device 102 may first have to provide a personal identification number in order to get the wireless device 102 or its SIM 104 to transmit credentials. The local mobile server systems 106 may search the database of the local mobile server systems 106 for the incoming IMSI and the K associated with the IMSI. Then the operator may generate a random number ("RAND") and may sign the random number with the K associated with the IMSI, thereby computing a first signed response ("SRES_1"). The operator network then sends the RAND to the wireless device 102 or to the SIM 104. The wireless device 102 or the SIM 104 signs the RAND with the K of the wireless device producing a second signed response ("SRES_2") which is sent back to, and received by, the local mobile server systems 106 with an encryption key ("$K_g$"). The local mobile server systems 106 compare the SRES_1 and SRES_2 received is the same as the SER_1 and SER-2 stored or generated by local mobile server systems 106, the wireless device 102 and/or SIM 110 of wireless device 102 are authenticated.

In step 422, the local mobile server systems 106 enable the wireless device 102 to connect to the local mobile server systems 106. Once the wireless device 102 has access to the local mobile server systems 106, the wireless device 102 may access data on the local mobile server systems 106. In one embodiment, the wireless device 102 may operate a mobile hotspot network and supply the data to other networked devices 105. Enabling wireless device 102 to have access to data on local mobile server systems 106 may allow a person to operate a mobile hotspot without accruing roaming charges in places located outside of the user's or wireless device's 102 primary coverage area.

In an embodiment, each of the steps of the method shown in FIG. 4 is a distinct step. In another embodiment, although depicted as distinct steps in FIG. 4, steps 402-422 may not be distinct steps. In other embodiments, the method shown in FIG. 4 may not have all of the above steps and/or may have other steps in addition to or instead of those listed above. The steps of the method shown in FIG. 4 may be performed in another order. Subsets of the steps listed above as part of the method shown in FIG. 4 may be used to form their own method.

Figure 5:
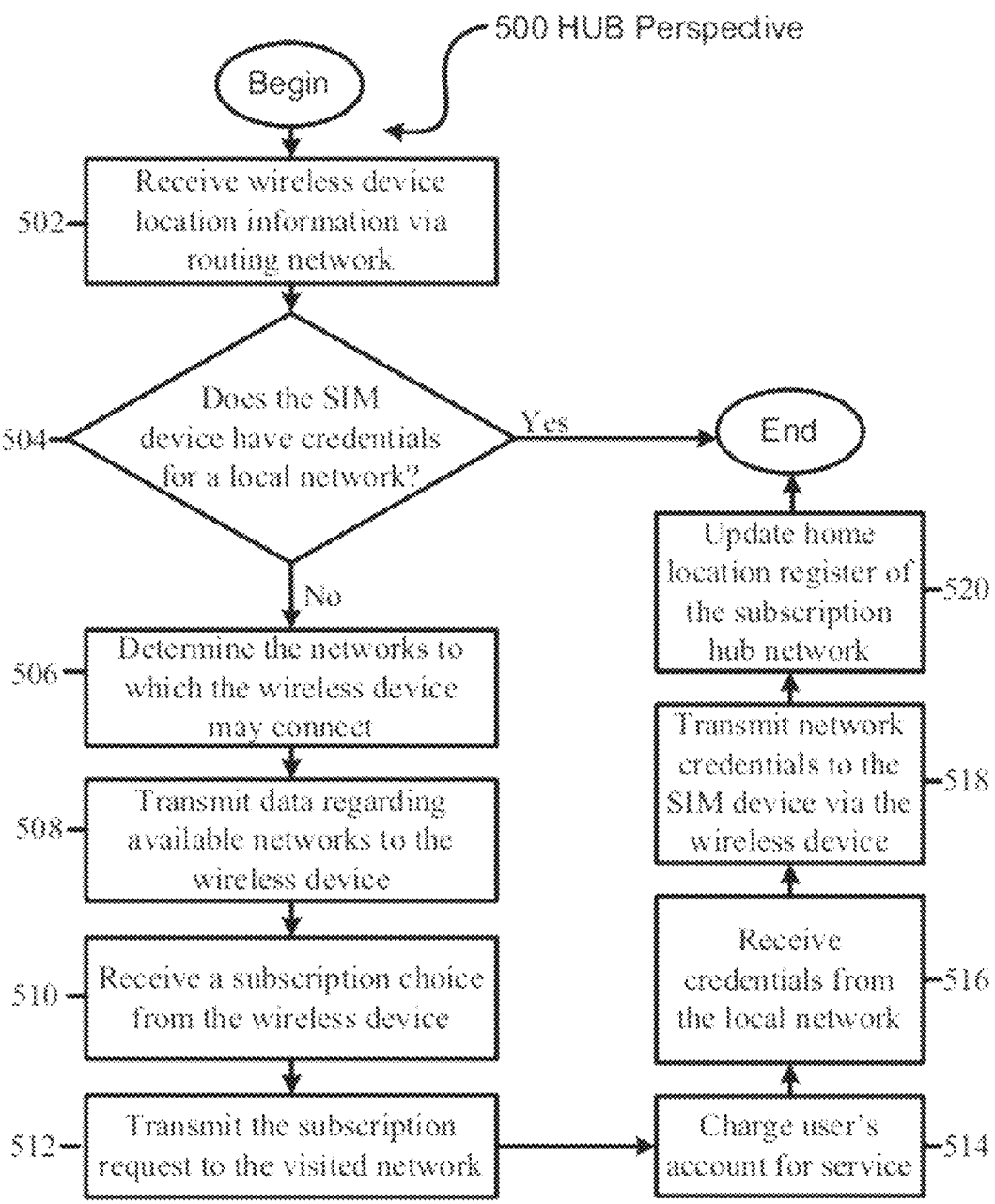
FIG. 5 shows a flowchart of an embodiment of a method of managing subscriptions, via the SFSS of FIGS. 1A and 1D for accessing wireless networks on an ad hoc basis.

FIG. 5 shows a flowchart of still another embodiment of a method 500 for obtaining and managing subscriptions for accessing wireless networks on an ad hoc basis from the point of view of SFSS 107. In this embodiment, the SFSS 107 may facilitate the connection between a wireless device 102 and an unsubscribed-to local network of local mobile server systems 106. In step 502, the SFSS 107 receives wireless device location information. This device location information can be used to determine what local networks 130 are available to the wireless device 102 and, potentially, which of the local networks 130 have specific contractual arrangements with the entity controlling the SFSS 107 to allow ad hoc subscriptions.

In step 504, the SFSS 107 determines whether the wireless device 102 has a subscription to a local mobile server systems 106. The SFSS 107 may determine based on the location information provided in step 502 as well as information stored in the subscription profile 182 whether there are any subscribed-to local networks 106. If the SFSS 107 determines that the wireless device 102 is in an area where a subscribed-to local mobile server systems 106 has coverage, the wireless device 102 may connect to the local mobile server systems 106. If the SFSS 107 finds no subscribed-to local mobile server systems 106, the SFSS 107 may determine the local networks 106 to which the wireless device may connect at step 506.

In step 506, the SFSS 107 determines the local networks 130 to which the wireless device may connect. The SFSS 107 may determine appropriate networks for the wireless device 102 based on the location of the wireless device 102, the hardware and software limitations of the wireless device 102, and the contractual obligations of a particular entity, for example.

In step 508, the SFSS 107 transmits data regarding available networks to the wireless device 102. This data may represent a number of things including the services available, the terms of subscription, and the relevant coverage areas, for example. The data may also be organized in a way to present to a user on a display in order to allow a user to select a particular subscription plan. Alternatively, the wireless device may auto-select the best option, potentially making display data may be superfluous.

In step 510, the SFSS 107 receives a subscription choice from the wireless device 102. Regardless of whether the wireless device 102 or the user selects the subscription, the choice is made and data representing the selection is transmitted to the SFSS 107. The SFSS 107 receives the subscription choice data and may update the subscription register 166 in the SFSS memory system 158.

In step 512, the SFSS 107 transmits the ad hoc subscription choice from the wireless device 102 to the local mobile server systems 106. In this embodiment, the SFSS 107 may transmit the subscription data to the local mobile server systems 106. In another embodiment, the SFSS 107 may not be involved in the exchange of subscription choices, so the subscription choice could be transmitted directly from the wireless device 102 to the local mobile server systems 106.

In step 514, the SFSS 107 charges the user or wireless device 102 account for service. The charging may occur at an account of the user associated with the wireless device 102 has with the entity that controls the SFSS 107. The charging may also occur at an account the wireless device 102 or user establishes with the local mobile server systems 106 when subscribing. Also, the user or wireless device 102 may not have a dedicated account with the either the SFSS 107 or the local mobile server systems 106. In an embodiment where the user does not have a dedicated account, the user or wireless device 102 may be charged directly by any payment method including, for example, charging a checking account, savings account, debit account, trust account, gas account, expense account, government agency account or credit card account.

In step 516, the SFSS 107 receives credential data from the local mobile server systems 106. Step 516 may allow the SFSS 107 to update the version of SFSS 107 of the subscription profile 182 located in the subscription register 166. In an alternative embodiment, the SFSS 107 does not itself maintain any information regarding the subscription or only maintains information not including the highly secretive credentials, for example. If the SFSS 107 receives the credential data, the data may be encrypted, given the confidential nature of the credential data.

In step 518, the SFSS 107 transmits network credentials to the wireless device 102. Again, the sensitive nature of the credentials makes it likely that the SFSS 107 would transmit the credentials in encrypted form. In this embodiment, the wireless device 102 may receive credentials from the SFSS 107. In an alternative embodiment, the wireless device 102 may receive credentials directly from the local mobile server systems 106.

Providing the wireless device 102 is given valid credentials, wireless device 102 should be able to access the local mobile server systems 106 and potentially operate a local hotspot network in order to connect with networked devices 105.

In an embodiment, each of the steps of the method shown in FIG. 5 is a distinct step. In another embodiment, although depicted as distinct steps in FIG. 5, steps 502-518 may not be distinct steps. In other embodiments, the method shown in FIG. 5 may not have all of the above steps and/or may have other steps in addition to or instead of those listed above. The steps of the method shown in FIG. 4 may be performed in another order. Subsets of the steps listed above as part of the method shown in FIG. 4 may be used to form their own method.

Figure 6:
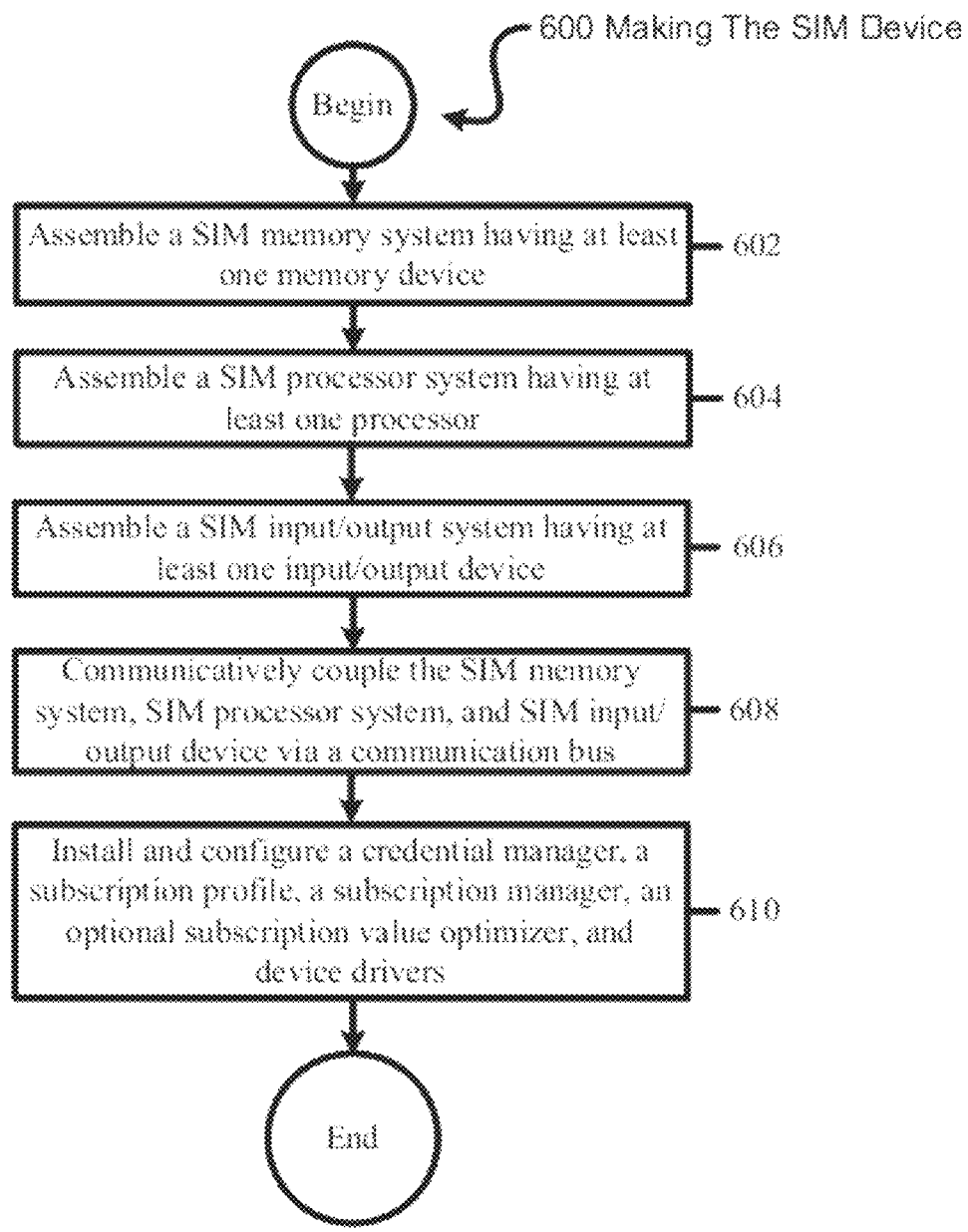
FIG. 6 shows a flowchart of an embodiment of a method for making the SIM of FIGS. 1A and 1E.

FIG. 6 shows a flowchart of an embodiment of a method 600 for making a SIM 104. In step 602, the SIMms 114 is assembled with at least one memory device. The memory system may comprise any number of different memory devices including, for example, any one of, some of, any combination of, or all of a long term storage system, such as a hard drive; a short term storage system, such as a random access memory; a removable storage system such as a disk drive, floppy drive or a removable drive; and/or flash memory. The SIMms 114 may include one or more machine readable media that may store a variety of different types of information. The term machine-readable media may be used to refer to any medium capable of carrying information that is readable by a machine. One example of a machine-readable medium is a computer-readable medium.

In step 604, the SPS 112 is assembled with at least one processor. The SPS 112 may include any one of, some of, any combination of, or all of multiple parallel processors, a single processor, a system of processors having one or more central processors, a logic circuit and/or one or more specialized processors dedicated to specific tasks.

In step 606, the SIOS 110 is assembled. The SIOS 110 may include any one of, some of, any combination of, or all of a display system, a speaker system, a connection or interface system to a sound system, an interface system to peripheral devices and/or a connection and/or an interface system to a computer system, intranet, and/or internet, and the like. The SIOS 110 may include a monitor and/or other output device. The device output system SIOS 110 may include an interface for sending output signals to the networked device 105.

In step 608, the SIMms 114, SPS 112, and SIOS are communicatively coupled directly, wirelessly or via a system bus 121.

In step 610, the subscription and credentialing routines 115, including the subscription profile 182, the subscription manager 184, the credential manager 186, and device drivers 192 are installed and configured. The subscription and credentialing routines 115 may be installed by executable file or by OEM process, for example.

The configuration may be automated or may provide the user the opportunity to set preferences. For instance, during the configuration, a user may be asked to provide special preferences for the networks to which the user would like to connect.

In an embodiment, each of the steps of the method 600 shown in FIG. 6 is a distinct step. In another embodiment, although depicted as distinct steps in FIG. 6, steps 602-610 may not be distinct steps. In other embodiments, the method 600 shown in FIG. 6 may not have all of the above steps and/or may have other steps in addition to or instead of those listed above. The steps of the method 600 shown in FIG. 6 may be performed in another order. Subsets of the steps listed above as part of the method shown in FIG. 6 may be used to form their own method.

Figure 7:
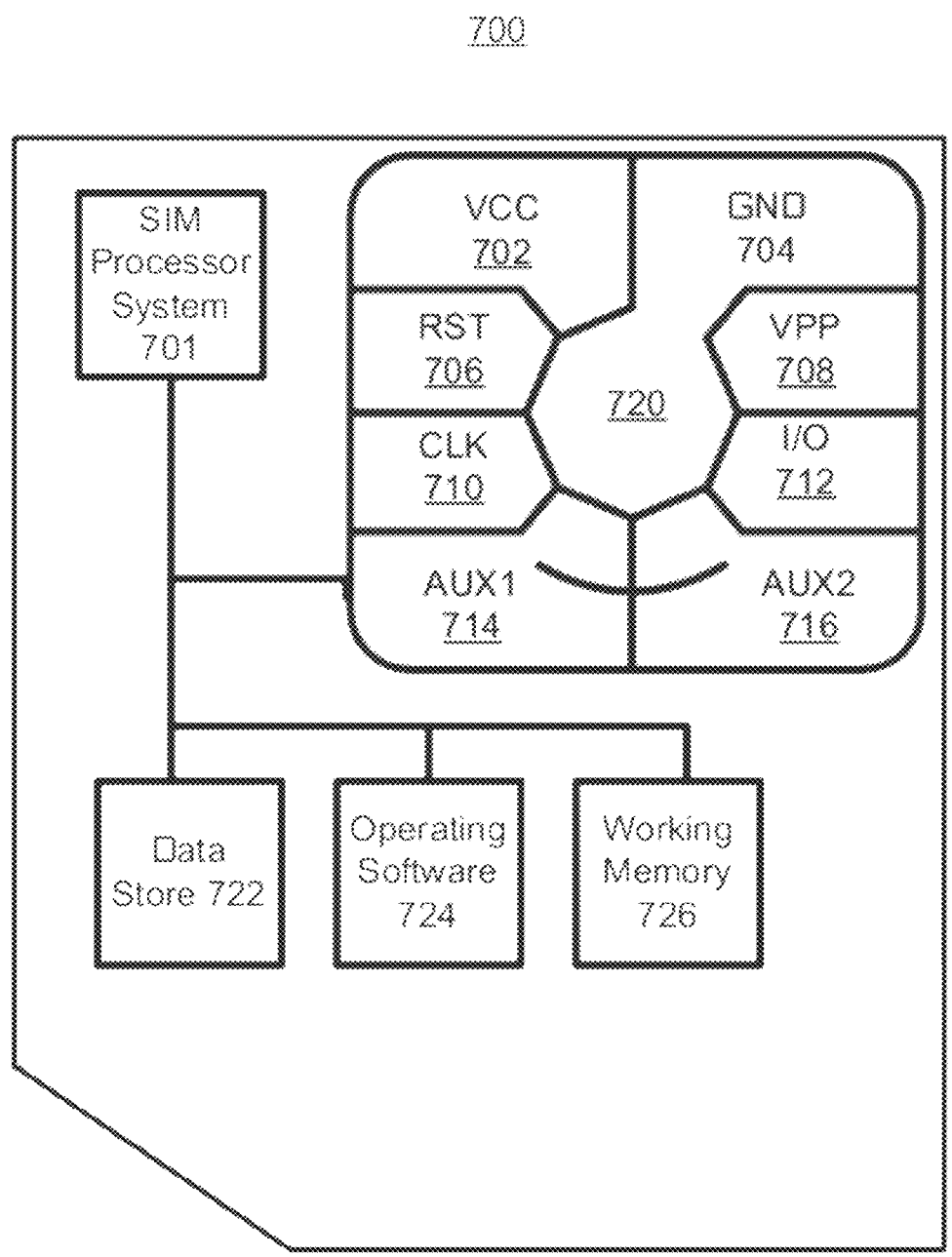
FIG. 7 shows a perspective view of an embodiment of the SIM of FIGS. 1A-1E, configured to connect and subscribe to local networks on an ad hoc basis.

FIG. 7 shows a perspective view of an embodiment of a SIM 104 configured to receive, store and transmit credential and subscription information on an ad hoc basis. The SIM 104 may be configured to add credentials in order to access networks on an ad hoc basis. The SIM 104 may include a SIM processor system 701, a data store 722, operating software 724, working memory 726, and a pin out 720.

The SIM processor system 701 executes the routines stored in the data store 722, operating software 724 and working memory 726. The SIM processor system may be an embodiment of the SPS 112 and may be configured to execute any of the subscription and credentialing routines 115, an embodiment of which is explained in FIG. 1E. The SPS 112 may be an embodiment of the SIM processor system 701.

The data store 722, operating software 724, and working memory 726 may all be elements of an embodiment of the SIMms 114. The data store 722 may be erasable, programmable read only memory configured to store data and may store subscription and credentialing data. The operating software 724 is used to operate the SIM 104 and execute its subscription and credentialing routines 115. The working memory 726 may be any kind of writable memory including random access memory, for example and may be used to hold intermediate values and constants as well as finished values, for example.

The pin out 720 is an input/output device used to help the SIM 104 function. The pin out 720 may be an embodiment of the SIOS 110. The pin out 720 may include a power supply ("VCC") 702, ground ("GND") 704, reset ("RST") 706, programming voltage ("VPP") 708, clock signal ("CLK") 710, input/output ("I/O") 712, first auxiliary input/output ("AUX1") 714, and second auxiliary input/output("AUX2").

The VCC 702 may provide the necessary power to effectuate subscription and credentialing routines 115. GND 704 can prevent electrical issues by providing a ground line. RST 706 may offer the option of resetting the SIM 104 to defaults or to a previous setting. VPP 708 may assure that the voltage is correct when communicating with devices. The CLK 710 may establish the timing for all functions of the SIM 104. The I/O 712 may allow data to be transferred to and from peripherals of the SIM 104. The AUX1 and AUX2 may be additional ports through which communication with the SIM 104 may occur. For instance, the AUX1 may connect to a USB outlet in order to allow USB communication with the SIM 104.

Figure 8:
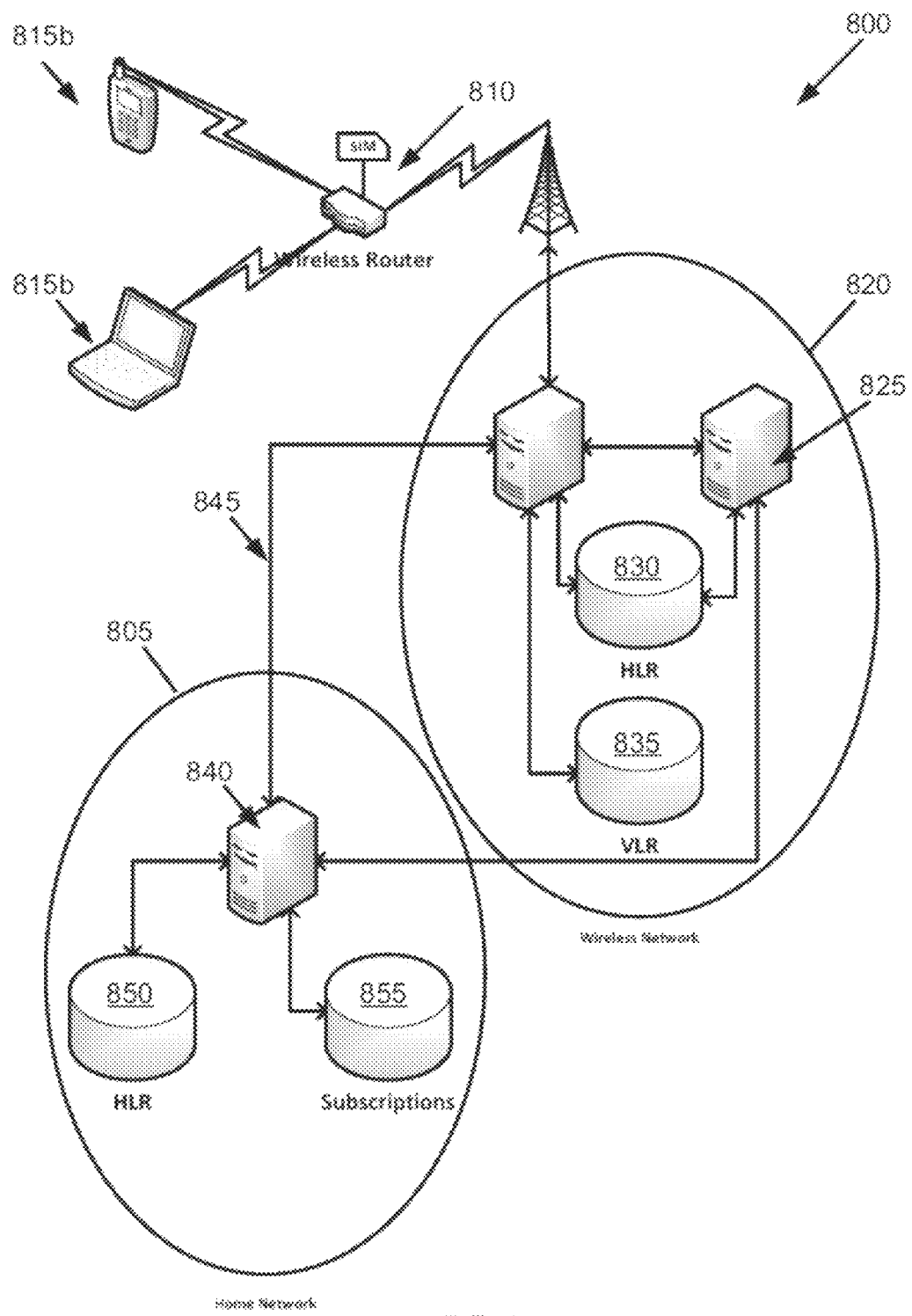
FIG. 8 is a schematic diagram of an embodiment of an architectural diagram of the system of FIGS. 1A-E for obtaining and managing subscriptions for accessing wireless networks on an ad hoc basis.

FIG. 8 is a schematic diagram of an embodiment of an architectural diagram of a system 800 for obtaining and managing subscriptions for accessing wireless networks on an ad hoc basis. The system 800 may include a home network 805, having the wireless device 810, a laptop 815a, cellular telephone 815b, wireless network 820, server devices 825, home location registration 830, visitor location register 835, application server 840, public and/or private communications channels 845, home location register 850, and subscriptions register 855. In other embodiments, the system 800 may not have all of the elements listed and/or may have other elements in addition to or instead of those listed.

FIG. 8 is a schematic diagram of an embodiment of an architectural diagram of a system 800 for obtaining and managing subscriptions for accessing wireless networks on an ad hoc basis. System 800 may be an embodiment of system 100. The system 800 may include a home network 805 that may be communicatively coupled with a plurality of wireless devices (shown here as a single wireless device 810). Home network 805 may be an embodiment of the SFSS 107. According to some embodiments, the wireless device 810 may include any one of a number of mobile wireless devices such as a wireless router, a smart phone, computing device, a cellular telephone, a personal digital assistant, and so forth. Wireless device 810 may be an embodiment of wireless device 802.

In some embodiments, the wireless device 810 may function as a communications bridge or router that communicatively couples end user devices such as a laptop 815a and cellular telephone 815b with one or more wireless networks (shown herein as a single wireless network 820). Laptop 815a and telephone 815b are examples of networked device 105 and 108. Wireless network 820 may be an embodiment of the local network of local mobile server systems 106. In an embodiment, the wireless device 810 may include an end user device such as a cellular telephone 815b that is configured to operate as a mobile hotspot.

Generally speaking, a mobile hotspot is an end user device that allows other computing devices to utilize the communications capabilities of the end user device. Allowing other computing devices to utilize communications capabilities of the user device may be useful when the mobile hotspot communicates with a provider network utilizing a communications protocol that is different than the communications protocols utilized by the end user device. For example, a laptop-computing device may utilize the wireless communications protocols of a cellular telephone hotspot by way of a Wi-Fi connection established between the laptop-computing device and the cellular telephone. Utilizing the wireless communications protocols of a cellular telephone hotspot by way of a Wi-Fi connection established between the laptop-computing device and the cellular telephone may be useful in locations where Wi-Fi communications capabilities are limited but cellular telephone communications capabilities are ubiquitous.

Rather than limiting the wireless device 810 to utilizing a single subscription profile for interacting with only one home wireless network, the wireless device 810 may be configured to maintain and utilize a plurality of subscription profiles such that the wireless device 810 may interact with multiple wireless networks while minimizing roaming charges. Allowing the wireless device 810 to interact with multiple wireless networks may reduce the need for the wireless device 810 to engage in roaming communications with these various wireless networks that are not the home wireless network of the wireless device 810.

Local mobile server systems 106 may be an embodiment of server device 825. HRL 144 is an embodiment of home location register 830, and VLR 146 is an embodiment of visitor location register 835.

Application server 840 may be an embodiment of SFSS 107. public and/or private communications channels 845. Home location register 850 is an embodiment of HRL 144, and subscriptions register 855 may be an embodiment subscription register 146.

Figure 9:
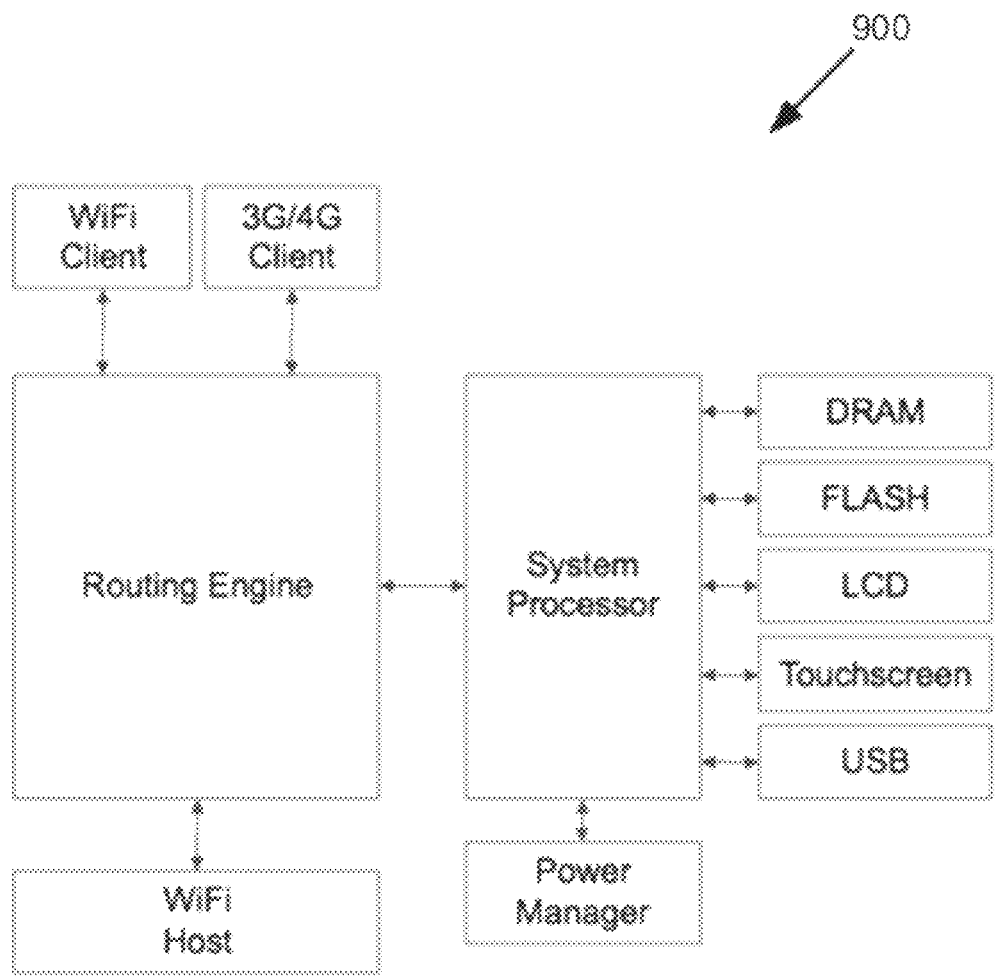
FIG. 9 is a schematic diagram of an exemplary wireless device of FIGS. 1A, 1B, and 8 having a routing engine.

FIG. 9 is a schematic diagram of an exemplary wireless device 900 having a processor system, a routing engine, and various input/output devices, such as a Wi-Fi interfaces (for a Wi-Fi client and a Wi-Fi host), a 3G/4G interface for 3G/4G client interface, a power manager, various forms of memory, such as DRAM and Flash, an system including an LCD, an input/output system including a touch screen, and a USB port.

Wireless device 900 may be an embodiment of wireless device 102 and/or wireless device 810. In an embodiment in which wireless device 102 is wireless device 900, Memory system 120 of wireless device 102 may store the routing engine, and include the DRAM and Flash of FIG. 9. Device output system 116 may include the LCD of FIG. 9. Input/output system 117 may include the Wi-Fi interfaces, 3G/4G client interface, and/or touch screen of FIG. 9. Alternatively, the input and output portions of the Wi-Fi interfaces, 3G/4G client interface, and/or touch screen of FIG. 9 may be divided between device input system 116 and device output system 118.

The wireless device 810 may include a routing engine for managing subscription profiles that allow the wireless device to interact with available wireless networks. The wireless device 810 may also include slots for multiple SIM cards, a Wi-Fi host module (for operating as a mobile hotspot), and a power manager for reducing unnecessary power consumption by the wireless device 810.

Generally speaking the routing engine may allow the end user of the wireless device 810 to purchase subscriptions for individual wireless network services on an ad hoc basis, only as needed.

In additional embodiments the routing engine may maintain one or more subscription profiles associated with one or more subscriber wireless networks. The terms "subscriber wireless network" may include wireless networks that would provide roaming communications services to the wireless device 810 but for the ability of the wireless device 810 to utilize a subscription therewith. Each subscriber wireless network may provide one or more subscription options to the home network 805. The home network 805 may be an embodiment of the SFSS 107.

The routing engine of the wireless device 810 may receive a list of available subscriber wireless networks that are within a given communications range of the wireless device 810. These profiles are received by way of a subscription manager associated with the home network 805, as will be discussed in greater detail below.

It is noteworthy to mention, that initially, the wireless device 810 may communicate with the home network 805 utilizing a roaming profile (e.g., not associated with a subscriber cellular network) to receive the list of available subscriptions. The home network 805 may provide the wireless device 810 with a plurality of subscription options associated with the subscriber wireless networks that participate with the home network 805. For example, one cellular network may offer a particular amount of minutes of data service for a flat fee. A second cellular network may only offer rates at a given cost per minute. The end user of the wireless device 810 may select the most financially advantageous option, or may opt to utilize a more expensive wireless network if the wireless network has a superior data transfer speeds or call quality.

The wireless device 810 and home network 805 may be communicative coupled with one another via the wireless network 820. In some embodiments, the wireless network 820 may include a single wireless network, or a plurality of wireless networks depending on the location of the wireless device 810.

The wireless network 820 may include a host of components that facilitate the wireless communications between wireless device 810 and other wireless devices, wired devices (e.g., through plain old telephone service "POTS"), or the Internet. The wireless network 820 may include a plurality of server devices 825, a home location register 830, and a visitor location register database 835, along with many other components. A discussion of these additional components has been omitted for the sake of brevity.

The wireless network 820 may communicatively couple with the wireless device 810 via a wireless transceiver such as a cellular telephone tower. It will be understood that a wireless transceiver may be owned by a particular cellular network provider. It will be further understood that multiple cellular network providers may have wireless transceivers that cover the same geographical locations.

If the wireless device 810 is a subscriber of the wireless network (also known as a "home" provider), the wireless device 810 may not be charged with roaming fees for data services. If the wireless device 810 is not a subscriber of the wireless network, the wireless device 810 may access the cellular transceiver as a roaming user. Often times, the wireless device 810 will incur roaming charges to utilize a cellular transceiver with which the wireless device 810 is not registered.

To determine whether the wireless device 810 is registered with the wireless network 820, the wireless network 820 may include a home location register 830. The home location register 830 may include a list of wireless devices (usually categorized by SIM, the international mobile equipment identity ("IMEI") data, phone number ("MSISDN"), and so forth) that are allowed to access the wireless network 820 without incurring roaming charges.

As stated previously, the home network 805 may register a list of subscription profiles of wireless devices that have purchase subscriptions for the wireless network 820 on the home location register 830 of the wireless network 820.

When a request for establishing a communications link is received from a wireless device 810, identifying information of the wireless device 810 (a subscription profile) may be ascertained by the wireless network 820 and checked against the records within the home location register 830.

In the event that the wireless network 820 determines that the wireless device 810 is associated with a subscription profile that is listed in the home location register 830, the wireless network 820 allows the wireless device to utilize the wireless network 820 (assuming subscription is not expired or exhausted).

In the event that the wireless network 820 determines that the wireless device 810 is not listed in the home location register 830, the wireless network 820 would save the identifying information of the wireless device 810 in the visitor location register 835. The visitor location register 835 also tracks the location of the wireless device 810 and assigns roaming numbers to the wireless device 810 as necessary. Roaming charges may accrue as the wireless device 810 receives and/or transmits data via the wireless network 820.

To minimize roaming charges, the home network 805 may cooperate with the wireless device 810 by providing the wireless device 810 with subscription options based upon the location of the wireless device 810 and available wireless networks within the location of the wireless device 810.

The home network 805 may include an application server 840 (or a plurality of application servers) that communicatively couples with the server devices 825 of the wireless network 820 (or multiple wireless networks), via public and/or private communications channels 845 or network connections. These communications channels 845 may include the Internet (such as with voice over Internet protocol "VOIP"), a wireless application protocol ("WAP"), a local area network ("LAN"), a wide area network ("WAN"), and a cellular communications network—just to name a few.

The home network 805 may also include a home location register 850 that is utilized to register identifying information associated the wireless device 810 (e.g., SIM, IMEI, and so forth), although the home location register 850 may include other types of identifying information for the wireless device 810. The home network 805 may also include a subscriptions register 855 that stores profiles for the wireless devices 810 along with available subscriptions for a plurality of wireless networks.

The application server 840 may include a subscription manager (not shown), such as subscription manager 184 (FIG. 1E), that maintains a list of available profiles that may be utilized by wireless devices 810 along with available subscriptions for a plurality of wireless networks. Additionally, the subscription manager may determine the available wireless networks based upon the location of the wireless device 810 as determined by one or more wireless transceivers with range of the wireless device 810 or by way of global positioning satellite ("GPS") systems.

Each available subscription may include information such as the name of the cellular network provider, along with a rate plan that includes service details such as cost per unit of time or a pre-paid amount of time that may be debited according to usage.

In some embodiments, the subscription manager may provide one or more subscription selections to the wireless device 810 and receive a selection of one of the one or more subscription selections from the wireless device 805.

A subscription profile may include identifying information for the wireless device 810 relative to a particular wireless network. For example, the wireless device 810 may be associated with a different MSISDN for each wireless network with which the wireless device 810 has a subscription.

Figure 10:
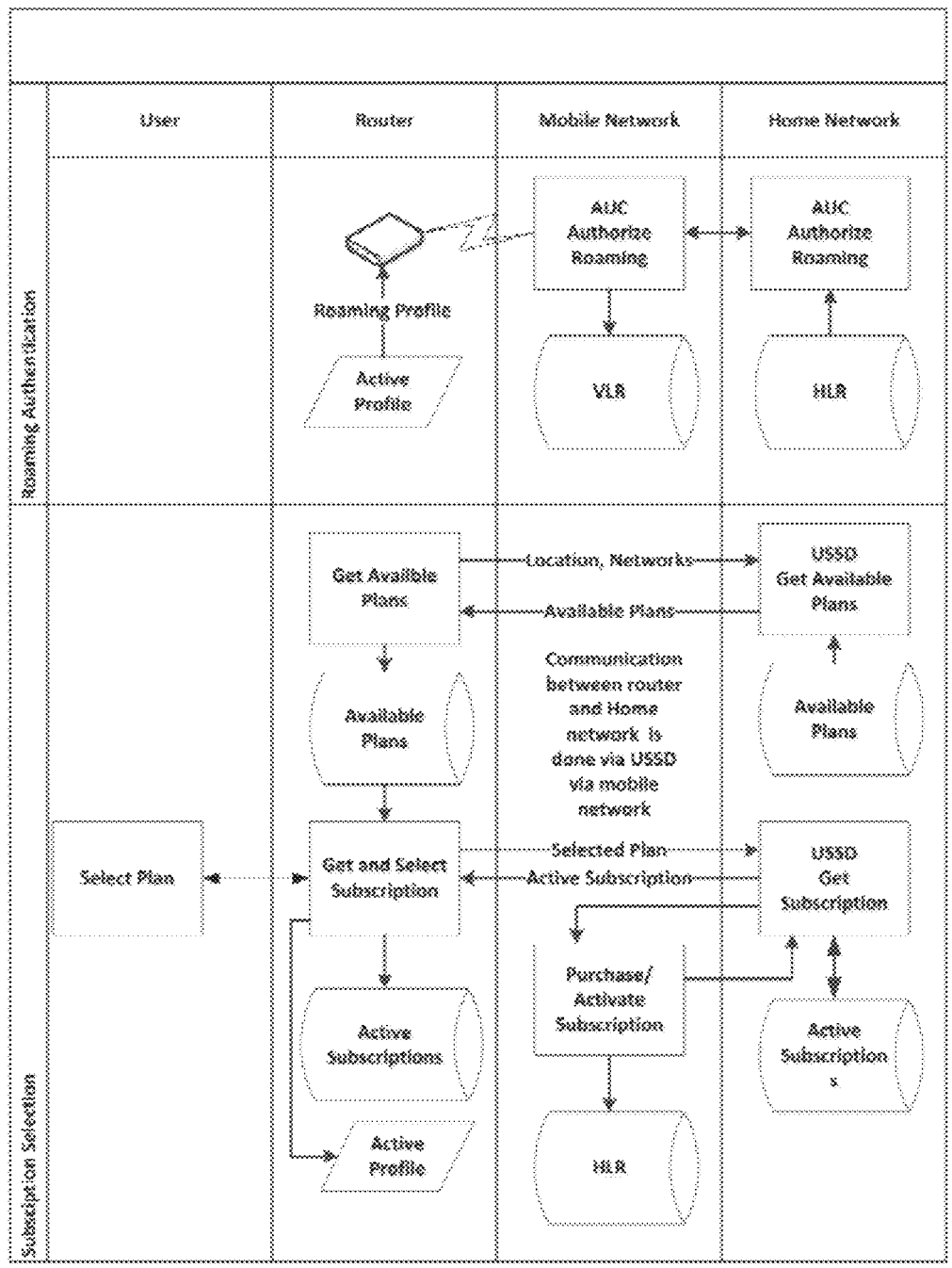
FIG. 10 is an exemplary flowchart illustrating roaming authentication and subscription selection within the example of the system of FIG. 8.

FIG. 10 is an example of a flow diagram illustrating roaming authentication and subscription selection within the example of system 800 (or system 100).

Figure 11:
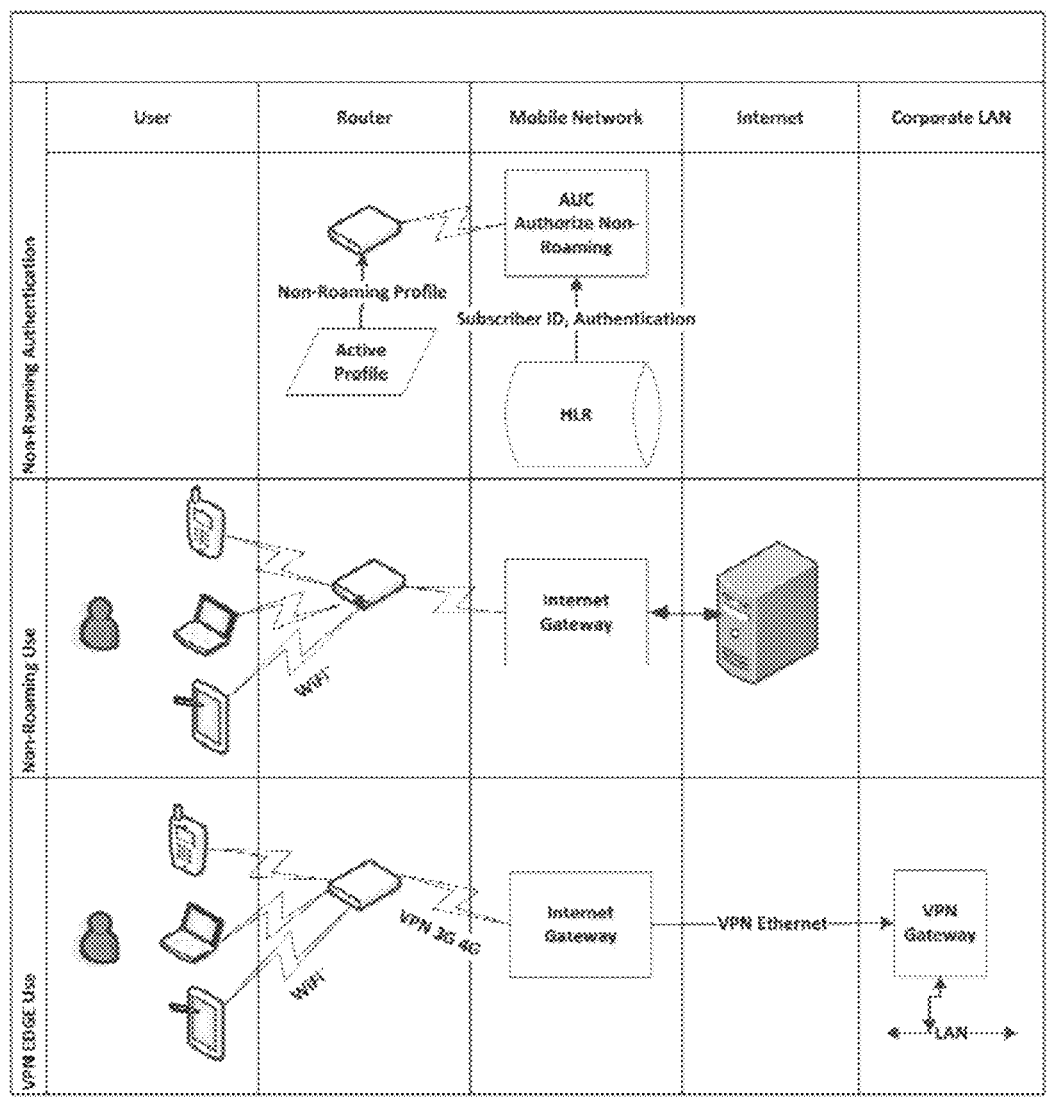
FIG. 11 is an additional flow diagram illustrating one embodiment of non-roaming authentication, non-roaming use, and VPN EDGE using one example of a wireless device.

FIG. 11 is an additional exemplary flow diagram illustrating one embodiment of non-roaming authentication, non-roaming use, and VPN EDGE use of the exemplary wireless device. Some of the above-described functions may be defined by instructions that are stored on a storage media (e.g., computer-readable media). The instructions may be retrieved and executed by the processor system of the computing system on which the system is resident. Some examples of storage media are memory devices, tapes, disks, integrated circuits, and servers (including cloud based computing systems). The instructions are operational when executed by the processor to operate in accordance with the present invention. Those skilled in the art are familiar with instructions, processor(s), and storage media.

The terms "computer-readable media" and "storage media," was explained above, and as used herein refer to any medium or media that participate in providing instructions to a CPU for execution. Such media can take many forms, including, but not limited to, non-volatile, non-transitory media, volatile media, and transmission media. Non-volatile media include, for example, optical or magnetic disks, such as a fixed disk. Volatile media include coaxial cables, copper wire and fiber optics, among others, including the wire that comprises an embodiment of a communications bus 129. Transmission media can also take the form of acoustic or light waves, such as those generated during radio frequency (RF) and infrared (IR) communications. Common forms of computer-readable media include, for example, a floppy disk, a flexible disk, a hard disk, magnetic tape, or any other suitable magnetic medium, a CD-ROM disk, digital video disk (DVD), any other optical medium, a RAM, a PROM, an EPROM, an EEPROM, a FLASHEPROM, or any other memory chip or cartridge, a carrier wave, or any other medium from which a computer can read.

Figure 12:
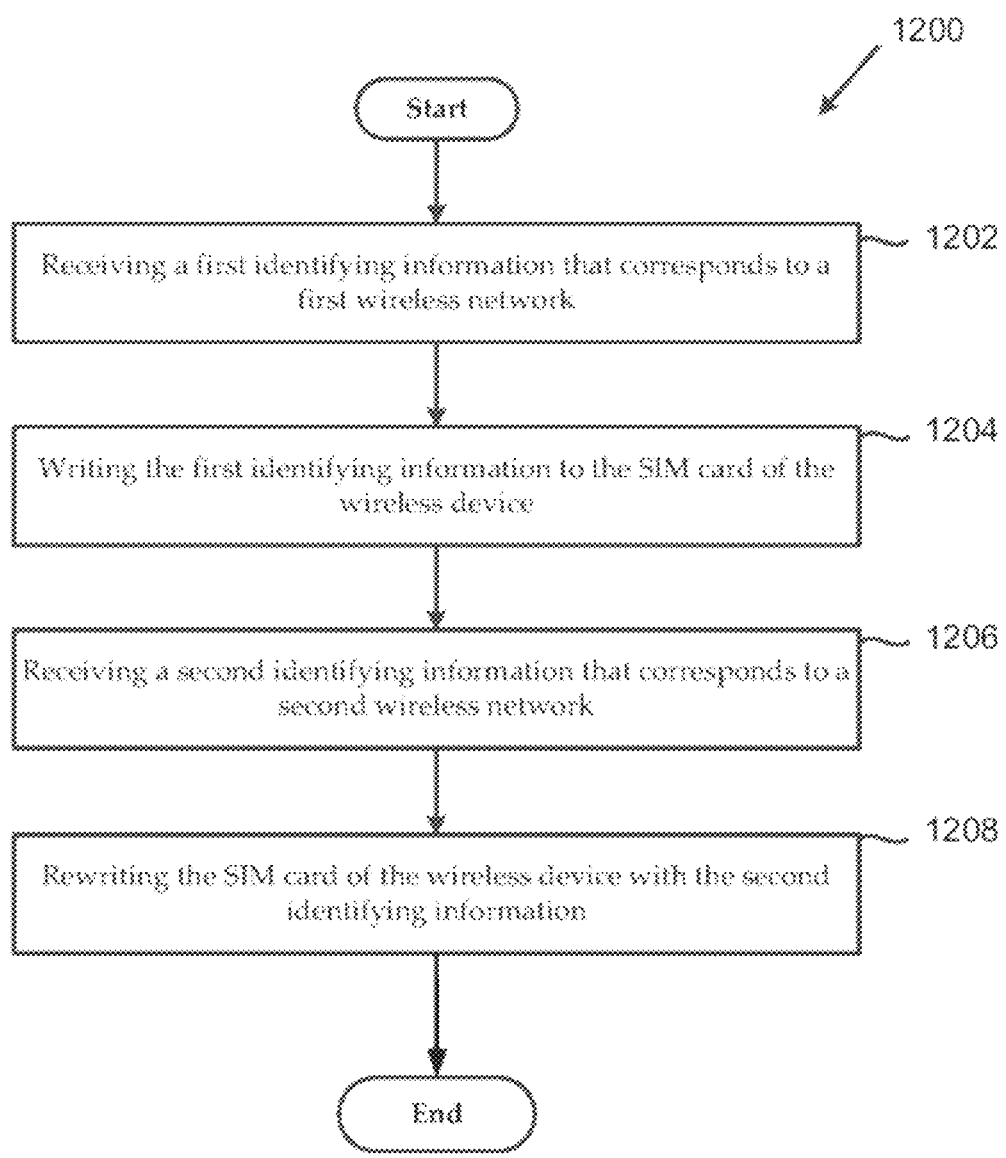
FIG. 12 is a flowchart of an embodiment of a method 1200 for reusing a subscriber identity module for multiple networks.

FIG. 12 is a flowchart of a method 1200 for reusing a subscriber identity module for multiple networks. The method 1200 may include the step 1202 of receiving the first identifying information that corresponds to the first wireless network. It is noteworthy that the first identifying information may include data such as a subscriber ID, an IMEI, and so forth. The methods of FIGS. 2-7 are embodiments of the methods of FIGS. 10-12. The methods of FIGS. 2-7 and the FIGS. 10-12 may be practiced using system 100 of FIGS. 1A-1E and/or of system 800 of FIGS. 8 and 9 (and system 800 of FIGS. 8 and 9 and system 100 of FIGS. 1A-1E may be embodiments of one another).

Next, the method may include the step 1204 of writing the first identifying information to the SIM card of the wireless device.

Upon the wireless device traversing outside the subscription area of the first wireless network, the method may include the step 1206 of receiving the second identifying information that corresponds to the second wireless network.

After receiving the second identifying information, the method may include the step 1208 of rewriting the SIM card of the wireless device with the second identifying information. As with the first identifying information, the second identifying information may include data such as a subscriber ID, an IMEI, and so forth.

Although not shown, it is noteworthy to mention that the method may include additional steps of receiving identifying information for additional wireless networks and rewriting the SIM card of the wireless device on an ad hoc basis, as the wireless device engages additional wireless networks.

Some of the above-described functions may be defined by instructions that are stored on a storage media (e.g., computer-readable media). The instructions may be retrieved and executed by the processor of the computing system on which the system is resident. Some examples of storage media are memory devices, tapes, disks, integrated circuits, and servers (including cloud based computing systems). The instructions are operational when executed by the processor to operate in accordance with the present invention. Those skilled in the art are familiar with instructions, processor(s), and storage media.

The terms "computer-readable media" and "storage media" as used herein refer to any medium or media that participate in providing instructions to a CPU for execution. Such media can take many forms, including, but not limited to, non-volatile, non-transitory media, volatile media, and transmission media. Non-volatile media include, for example, optical or magnetic disks, such as a fixed disk. Volatile media include coaxial cables, copper wire and fiber optics, among others, including the wire that comprises an embodiment of a bus. Transmission media can also take the form of acoustic or light waves, such as those generated during radio frequency (RF) and infrared (IR) communications. Common forms of computer-readable media include, for example, a floppy disk, a flexible disk, a hard disk, magnetic tape, or any other suitable magnetic medium, a CD-ROM disk, digital video disk (DVD), any other optical medium, a RAM, a PROM, an EPROM, an EEPROM, a FLASHEPROM, or any other memory chip or cartridge, a carrier wave, or any other medium from which a computer can read.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with the claims full scope of equivalents.

The invention claimed is:

1. A system for utilizing a subscriber identity module (SIM) device for connecting and subscribing to a local, network of local mobile service systems on an ad hoc basis, comprising:
   a SIM device having a non-transitory computer readable medium storing a subscription profile having subscription data and one or more machine readable instructions, which when invoked cause the SIM device to
      receive and store credential data including an authentication key from the local mobile service systems; and
      add a new subscription to the subscription profile;
   wherein the storing occurs on an ad hoc basis after the SIM device has left the manufacturer.

2. The system of claim 1, the SIM device having a non-transitory machine-readable medium with instructions, which, when invoked, may add new or update existing terms of services in the subscription profile stored on the SIM device in order to track up-to-date information regarding services provided by at least one of the local mobile service systems.

3. A system for utilizing a subscriber identity module (SIM) device for connecting and subscribing to a local network of local mobile service systems on an ad hoc basis comprising:
   a SIM device having a non-transitory computer readable medium storing a subscription profile having subscription data and one or more machine readable instructions, which when invoked cause the SIM device to
      receive and store credential data including an authentication key from the local mobile service systems; and
      add a new subscription to the subscription profile or update an existing subscription in the subscript profile:
   wherein the storing occurs on an ad hoc basis after the SIM device has left the manufacturer; and
   wherein the local network is a mobile network operator which owns or controls access to a radio spectrum license from a regulatory or government entity.

4. A system for utilizing a SIM device for connecting and subscribing to a local network of local mobile server systems on an ad hoc basis, comprising:
   a SIM device having: a non-transitory computer readable medium storing one or more machine readable instructions, which when invoked cause the SIM device to
      store credential data including at least an authentication key from the local mobile server systems,
   wherein the storing occurs on an ad hoc basis after the SIM device has left the manufacturer, wherein the one or more machine readable instructions, when invoked, are capable of causing the storing of three or ore currently valid authentication keys that belong to one user.

5. The system of claim 4, wherein each of the three or more authentication keys is associated with a different mobile server system.

6. A system for utilizing a subscriber identity module (SIM) device for connecting and subscribing to a local network of local mobile service systems on an ad hoc basis, comprising:
   a SIM device having a non-transitory computer readable medium storing a subscription profile having subscription data and one or more machine readable instructions, which when invoked cause the SIM device to
receive and store credential data including an authentication key from the local mobile service systems; and
add a new subscription to the subscription profile, the new subscription having been prepurchased by an entity other than a user of the SIM device and providers of the local mobile service systems and then given to the user;
wherein the storing occurs on an ad hoc basis after the SIM device has left the manufacturer.

7. The system of claim 6, further comprising a wireless device communicatively coupled to the SIM device.

8. The system of claim 7, the computer readable medium storing thereon one or more machine instructions to operate a mobile hotspot by transmitting data with a transceiver in order to transmit data from a local network to a networked device.

9. The system of claim 7, wherein the wireless device is a cellular telephone.

10. The system of claim 6, wherein the non-transitory computer readable medium storing one or more machine readable instructions, which when invoked cause the SIM device to receive the credential data from the local network of the local mobile server system.

11. The system of claim 10, wherein the receiving at the SIM device of credential data from the local network of the local mobile server system occurs via service fulfillment server systems by the local network transmitting the credential data to the service fulfillment server system and the service fulfillment server systems transmitting the credential data to the SIM device.

12. The system of claim 11, wherein the receiving at the SIM device of credential data from the service fulfillment server systems occurs via a wireless device in that the service fulfillment server systems transmitted the credential data to the wireless device and the wireless device transmitted the credential data to the SIM device.

13. The system of claim 11, wherein the service fulfillment server system and the local mobile service systems are owned by different entities.

14. The method of claim 6, the SIM device having a non-transitory machine-readable medium with instructions, which, when invoked, stores three or more authentication keys.

15. A method for utilizing a local network of local mobile service systems to allow a SIM device to connect and subscribe to the local network of local mobile service systems on an ad hoc basis, comprising:
receiving at the local network of local mobile service systems a subscription request; and
in response to the receiving of the subscription request,
approving the subscription request by at least one of the local mobile service systems, and
transmitting credential data from the local network to the SIM device,
wherein the receiving and transmitting occur on an ad hoc basis after the SIM device has left the manufacturer.

16. The method of claim 15 wherein the credentials include an authentication key and an international mobile subscriber identity.

17. The method of claim 15, wherein the local network is a mobile network operator which owns or controls access to a radio spectrum license from a regulatory or government entity.

18. A method for utilizing a local network of local mobile service systems to allow a SIM device to connect and subscribe to the local network of local mobile service systems on an ad hoc basis, comprising:
receiving at the local network of local mobile service systems a subscription request and
in response to the receiving of the subscription request,
approving the subscription request by at least one of the local mobile service systems, and
transmitting credential data from the local network to the SIM device,
wherein the receiving and transmitting occur on an ad hoc basis after the SIM device has eft the manufacturer; and
wherein the subscription request is received by the local network from a service fulfillment server system, the service fulfillment server being a server that coordinates data subscriptions and allows the SIM device located outside coverage area of the SIM device's current subscriptions to subscribe to a local network with local network coverage.

19. The method of claim 18, further comprising transmitting new terms of service from the local network to the service fulfillment server system, wherein the new terms of service are different from terms of a service associated with credential information that are stored in the SIM device.

20. A method for utilizing, a local network of a local mobile server systems to allow a SIM device to connect and subscribe to the local network of local mobile service systems on an ad hoc basis, comprising:
receiving at the local network of local mobile service systems a subscription request; and
transmitting credential data from the local network to the SIM device,
wherein the receiving and transmitting occurs on an ad hoc basis after the SIM device has left the manufacturer, wherein the local network is a mobile network operator which owns or controls access to a radio spectrum, license from a regulatory or government entity.

21. A method for utilizing a local network of local mobile service systems to allow a SIM device to connect and subscribe to the local network of local mobile service systems on an ad hoc basis, comprising:
receiving at the local network of local mobile service systems a subscription request; and
in response to the receiving of the subscription request,
approving the subscription request by at least one of the local mobile service systems,
transmitting credential data from the local network to the SIM device,
receiving credential data at the local network in order to authenticate the SIM device and
allowing the SIM device access to the local network;
wherein the receiving and transmitting occur on an ad hoc basis after the SIM device has left the manufacturer.

22. A method for utilizing a service fulfillment server system to allow a SIM device to connect and subscribe to a local network of local mobile service systems on an ad hoc basis, comprising:
receiving at the service fulfillment server system a subscription request from the SIM device;
transmitting from the service fulfillment server system to the SIM device a selection of at least one available subscription option to at least one of the local mobile service systems;
receiving at the service fulfillment server system credential data from the local service systems; and as a result of the subscription request and receipt of the credential data, transmitting, from the service fulfillment server system, the credential data to the SIM device, wherein the receiving and transmitting occur on an ad hoc basis after the SIM device has left the manufacturer.

23. The method of claim 22, wherein the local network of the local mobile server systems is controlled by a mobile network operator which owns or controls access to a radio spectrum license from a regulatory or government entity.

24. A method for utilizing a service fulfillment server system to allow a SIM device to connect and subscribe to a local network of local mobile service systems on an ad hoc basis, comprising:
receiving at the service fulfillment server system credential data from the local mobile service systems; and
transmitting, from the service fulfillment server system, the credential data to the SIM device;
wherein the receiving and transmitting occur on an ad hoc basis after the SIM device has left the manufacturer, and
wherein the credentials include, an authentication key and an international mobile subscriber identity.

25. A method for utilizing a service fulfillment, server system to allow a SIM device to connect and subscribe to a local network of local mobile service systems on an ad hoc basis comprising:
receiving at the service fulfillment server system a subscription request from the SIM device;
transmitting from the service fulfillment server system to the SIM device a selection of at least one available subscription option to at least one of the local mobile service systems;
receiving at the service fulfillment server system credential data from the local mobile service systems; and
as a result of the subscription request and receipt of the credential data, transmitting, from the service fulfillment server system the credential data to the SIM device,
wherein the receiving and transmitting occurs on an ad hoc basis after the SIM device has left the manufacturer;
wherein the transmitting occurs via a wireless device, the service fulfillment server system transmitting the credential data to the wireless device and the wireless device transmitting the credential data to the SIM device.

26. A method for utilizing a service fulfillment server system to allow a SIM device to connect and subscribe to a local network of local mobile service systems on an ad hoc basis, comprising:
receiving at the service fulfillment server system a subscription request from the SIM device;
transmitting from the service fulfillment server system to the SIM device a selection of at least one available subscription option to at least one of the local mobile service systems;
receiving at the service fulfillment server system credential data from the local mobile service systems; and
as a result of the subscription request and receipt of the credential data, transmitting, from the service fulfillment server system, the credential data to the SIM device,
wherein the receiving and transmitting occur on an ad hoc basis after the SIM device has left the manufacturer;
wherein the credential data includes one or more authentication keys and one or more international mobile subscriber identities.

27. A method for utilizing a service fulfillment server system to allow a SIM device to connect and subscribe to a local network of local mobile service systems on an ad hoc basis, comprising:
receiving at the service fulfillment server system a subscription request from the SIM device;
transmitting from the service fulfillment server system to the SIM device a selection of at least one available subscription option to at least one of the local mobile service systems;
receiving at the service fulfillment server system credential data from the local mobile service systems; and
as a result of the subscription request and receipt of the credential data, transmitting, from the service fulfillment server system, the credential data to the SIM device,
transmitting new or updated terms of service from the service fulfillment server system to the SIM device;
wherein the receiving and transmitting occur on an ad hoc basis after the SIM device has left the manufacturer.

28. A method for utilizing a service fulfillment server system to allow a SIM device to connect and subscribe to a local network of local mobile service systems on an ad hoc basis, comprising:
receiving at the service fulfillment server system a subscription request from the SIM device;
transmitting from the service fulfillment server system to the SIM device a selection of at least one available subscription option to at least one of the local mobile service systems;
receiving at the service fulfillment server system credential data from the local mobile service systems; and
as a result of the subscription request and receipt of the credential data, transmitting, from the service fulfillment server system, the credential data to the SIM device,
wherein the receiving and transmitting occur on an ad hoc basis after the SIM device has left the manufacturer,
wherein the service fulfillment server system and the local mobile service systems are owned by different entities.

29. A system for utilizing a subscriber identity module (SIM) device for connecting and subscribing to a local network of local mobile service systems on an ad hoc basis, comprising:
a SIM device having a non-transitory computer readable medium storing a subscription profile having subscription data and one or more machine readable instructions, which when invoked cause the SIM device to
receive and store credential data including, an authentication key from the local mobile service systems; and
update an existing subscription in the subscription profile;
wherein the storing occurs on an ad hoc basis after the SIM device has left the manufacturer.

* * * * *